(12) United States Patent
Miyaguchi et al.

(10) Patent No.: US 6,246,937 B1
(45) Date of Patent: Jun. 12, 2001

(54) CONTROL APPARATUS OF OCCUPANT PROTECTION DEVICE

(75) Inventors: Koichi Miyaguchi; Yasumasa Kanameda; Joerg Heckel; Masami Okano, all of Tomioka (JP)

(73) Assignee: Bosch Electronics Corporation, Gumma (JP)

( * ) Notice: Subject to any disclaimer, the term of this patent is extended or adjusted under 35 U.S.C. 154(b) by 0 days.

(21) Appl. No.: 09/516,626

(22) Filed: Mar. 1, 2000

(30) Foreign Application Priority Data

Mar. 8, 1999 (JP) .................................. 11-059752
Mar. 9, 1999 (JP) .................................. 11-061575

(51) Int. Cl.$^7$ ............................................. B60R 21/32
(52) U.S. Cl. ........................... 701/45; 701/46; 280/735
(58) Field of Search ................... 701/45, 46, 47; 280/735, 724; 180/280, 271, 274; 340/436, 438

(56) References Cited

U.S. PATENT DOCUMENTS 5,544,915 * 8/1996 Fendt et al. ............................ 280/735
6,167,335 * 12/2000 Ide et al. ............................... 701/45

FOREIGN PATENT DOCUMENTS 885414  4/1996  (JP) .

* cited by examiner

*Primary Examiner*—Tan Nguyen
(74) *Attorney, Agent, or Firm*—Birch, Stewart, Kolasch & Birch, LLP

(57) ABSTRACT

A control apparatus of an occupant protection device, in addition to a room acceleration sensor provided in a room of a vehicle, has at least one front acceleration sensor provided in a front part of the vehicle. The front acceleration sensor, when detecting a predetermined collision acceleration, gives a detection signal to a control unit. The control unit sets a second threshold value lower than a first threshold value if the detection signal is input, and drives the occupant protection device when an integrated value of an acceleration signal of the room acceleration sensor exceeds the second threshold value. Since the front acceleration sensor is provided in the front part of the vehicle, even when a collision acceleration transmitted to the room acceleration sensor is weakened, the front acceleration sensor detects the collision acceleration early and gives the detection signal to the control unit. By this, since the second threshold value lower than the first threshold value is set, the control unit can exactly drive the occupant protection device, such as an airbag, without causing a delay.

36 Claims, 18 Drawing Sheets

FIG. 4
(a) OUTPUT OF DIFFERENTIAL AMPLIFIER CIRCUIT 13
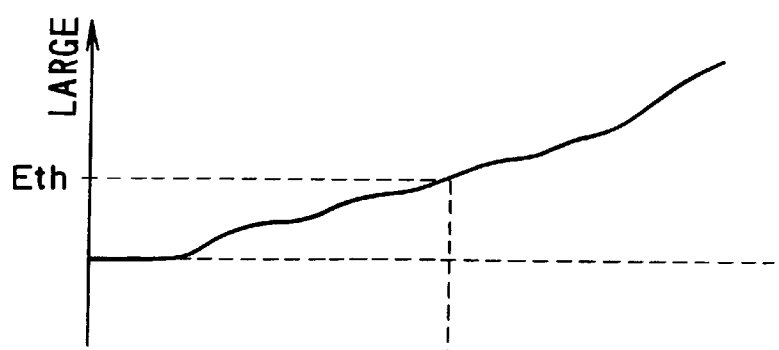
(b) SWITCHING TRANSISTOR 41
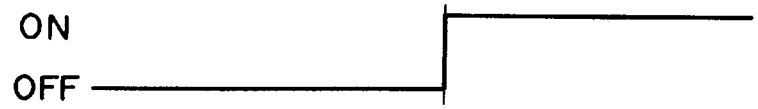
(c) CURRENT VARIATION IN SENSOR POWER SUPPLY LINE 23
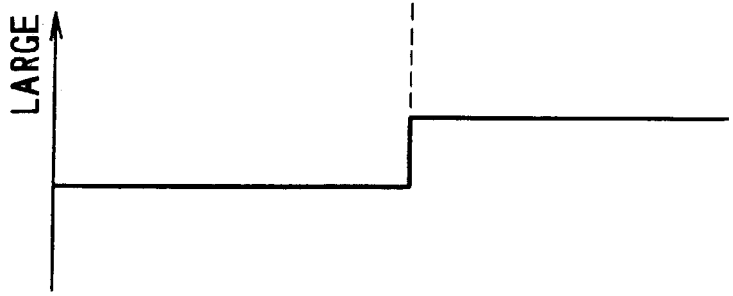

CONTROL APPARATUS OF OCCUPANT PROTECTION DEVICE

BACKGROUND OF THE INVENTION

The present invention relates to a control apparatus for controlling an occupant protection device of a vehicle, such as an airbag and seat-belt tensioner.

A conventional control apparatus for controlling an occupant protection device, as shown in The Japanese Patent Laid Open Publication No.8-85414, for example, has an acceleration sensor provided on a floor tunnel in a car room. The acceleration sensor detects an acceleration operating to a car body through the floor tunnel, and gives an analog signal representative of the acceleration to the control apparatus. The control apparatus integrates the acceleration signal from the acceleration sensor, detects an occurrence of a collision requiring a drive of an occupant protection device based on a comparison between an integrated value of the acceleration signal and a predetermined collision decision threshold value, and drives the occupant protection device such as an airbag.

By the way, when an impact of collision is absorbed by a crush of a collision part of the car body, it can be assumed that a collision acceleration transmitted to the floor tunnel is weakened. In such a case, since an acceleration detected by the acceleration sensor provided on the floor tunnel is small, though there is no fear of it causing difficulties in occupant protection at time of collision, a fear of causing a delay in driving the occupant protection device exists. In particular, a collision, such as an offset collision or an oblique collision, tends to cause a case in which the acceleration transmitted to the floor tunnel is weakened. Because of this, from the viewpoint of improving a control of the occupant protection device, regardless of whether the collision acceleration transmitted to the acceleration sensor provided in the car room is weakened, an exact control of the occupant protection device is desired.

SUMMARY OF THE INVENTION

It is an object of the present invention to provide an improved control apparatus of an occupant protection device.

Another object of the present invention is to provide a control apparatus that can exactly control the occupant protection device, regardless of whether a collision acceleration transmitted to an acceleration sensor provided in a car room is weakened.

The above and other objects are attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle, and for outputting a detection signal when detecting a predetermined collision acceleration; and a control unit, connected to said room acceleration sensor and said front acceleration sensor, for inputting the acceleration signal of said room acceleration sensor and the detection signal of said front acceleration sensor, for setting a first threshold value when the detection signal is not input, for setting a second threshold value lower than the first threshold value when the detection signal is input, and for driving the occupant protection device when an integrated value of the acceleration signal of said room acceleration sensor exceeds the set threshold value.

According to a composition like this, the front acceleration sensor outputs the detection signal when the predetermined collision acceleration is detected. Hereby, the second threshold value lower than the first threshold value is set, and the occupant protection device is driven when the integrated value of the acceleration signal of the room acceleration sensor exceeds the second threshold value. Since the front acceleration sensor is provided in the front part of the vehicle, even when a collision acceleration transmitted to the room acceleration sensor is weakened, the front acceleration sensor detects the collision acceleration early and gives the detection signal to the control unit. By this, since the second threshold value lower than the first threshold value is set, the control unit can exactly drive the occupant protection device without causing a delay in collision decision.

The above and other objects are also attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle, and for outputting a detection signal when detecting a predetermined collision acceleration; and a control unit, connected to said room acceleration sensor and said front acceleration sensor, for inputting the acceleration signal of said room acceleration sensor and the detection signal of said front acceleration sensor, for setting a basic threshold value as a threshold value when the detection signal is not input, for setting a low threshold value as the threshold value by subtracting a predetermined decrement value from the basic threshold value when the detection signal is input, and for driving the occupant protection device when an integrated value of the acceleration signal of said room acceleration sensor exceeds the threshold value.

According to a composition like this, if the detection signal is input from the front acceleration sensor, the low threshold value lower than the basic threshold value is set as the threshold value by subtracting the predetermined decrement value from the basic threshold value. Hence, the integrated value of the acceleration signal of the room acceleration sensor exceeds the threshold value without causing a delay, and the occupant protection device is exactly driven.

The above and other objects are also attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle, for outputting a first detection signal when detecting a first predetermined collision acceleration, and for outputting a second detection signal when detecting a second predetermined collision acceleration larger than the first predetermined collision acceleration; and a control unit, connected to said room acceleration sensor and said front acceleration sensor, for inputting the acceleration signal of said room acceleration sensor and the first and second detection signals of said front acceleration sensor, for increasing an integrated value of the acceleration signal of said room acceleration sensor by adding a first addition value to said integrated value when the first detection signal is input, for further increasing said integrated value by adding a second addition value larger than the first addition value to said integrated value when the second detection signal is input, and for driving the occupant protection device when said integrated value exceeds a predetermined threshold value.

According to a composition like this, the front acceleration sensor provided in the front part of the vehicle outputs the first detection signal when the first predetermined collision acceleration is detected, and outputs the second detection signal when the second predetermined collision acceleration larger than the first predetermined collision acceleration is detected. The integrated value of the acceleration signal of the room acceleration sensor is increased if the first detection signal is input, and is further increased if the second detection signal is input. Hence, the integrated value of the acceleration signal of the room acceleration sensor exceeds the threshold value without causing a delay, and the occupant protection device is exactly driven.

Furthermore, the above and other objects are attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle, for outputting a first detection signal when detecting a first predetermined collision acceleration, and for outputting a second detection signal when detecting a second predetermined collision acceleration larger than the first predetermined collision acceleration; and a control unit, connected to said room acceleration sensor and said front acceleration sensor, for inputting the acceleration signal of said room acceleration sensor and the first and second detection signals of said front acceleration sensor, for setting a basic threshold value as a threshold value when the first and second detection signals are not input, for setting a first low threshold value lower than the basic threshold value as the threshold value when the first detection signal is input, for setting a second low threshold value lower than the first low threshold value as the threshold value when the second detection signal is input, and for driving the occupant protection device when an integrated value of the acceleration signal of said room acceleration sensor is larger than the threshold value.

According to a composition like this, the first low threshold value lower than the basic threshold value is set as the threshold value if the first detection signal is input, and the second low threshold value lower than the first low threshold value is set as the threshold value if the second detection signal is input. Hence, the integrated value of the acceleration signal of the room acceleration sensor exceeds the threshold value without causing a delay, and the occupant protection device is exactly driven.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and attendant advantages of the present invention will be appreciated as the same become better understood by means of the following description and accompanying drawings wherein:

FIG. 4 is an explanatory drawing for explaining an operation of the front acceleration sensor of FIG. 2;

DETAILED DESCRIPTION OF THE INVENTION

Figure 1:
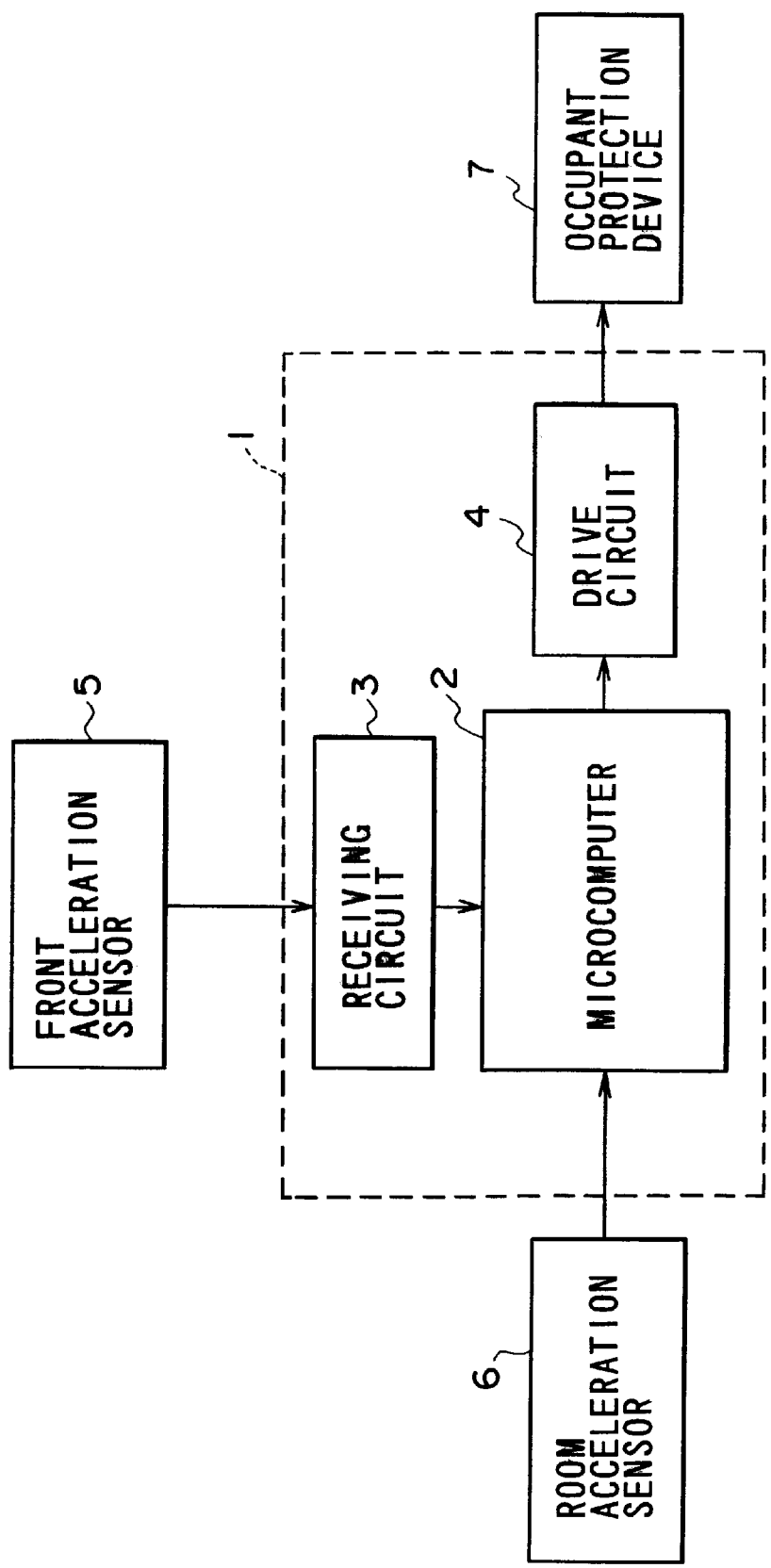
FIG. 1 is a block diagram showing a first embodiment of the present invention.

In FIG. 1, a control unit 1 has a microcomputer 2, a receiving circuit 3 and a drive circuit 4. The microcomputer 2 inputs a sensor output of a front acceleration sensor 5 by way of the receiving circuit 3, inputs a sensor output of a room acceleration sensor 6, and gives a collision detection signal to the drive circuit 4 based on the sensor outputs of the acceleration sensors 5 and 6. The drive circuit 4, when the collision detection signal is given, outputs a drive signal to an occupant protection device 9, and thereby the occupant protection device 9 is driven. The occupant protection device 9 is an airbag or a seat-belt tensioner. The control unit 1 is provided on a floor tunnel in a car room.

The front acceleration sensor 5 is provided in a center part of a vehicle front where an impact of collision can easily be absorbed, for example, near a radiator like a center part of a radiator mount maintaining the radiator. Since such a part is relatively soft in a car body, a collision impact can easily be absorbed and transmission of a collision acceleration to the floor tunnel tends to be weakened. The front acceleration sensor 5, when a predetermined collision acceleration is detected, gives the control unit 1 a detection signal representative thereof as the sensor output. Since the front acceleration sensor 5 has a temperature compensation function as described below, the front acceleration sensor 5 can be provided without requiring a consideration whether it receives heat from an engine. The front acceleration sensor 5 has a circuit composition shown in FIG. 2.

Figure 2:
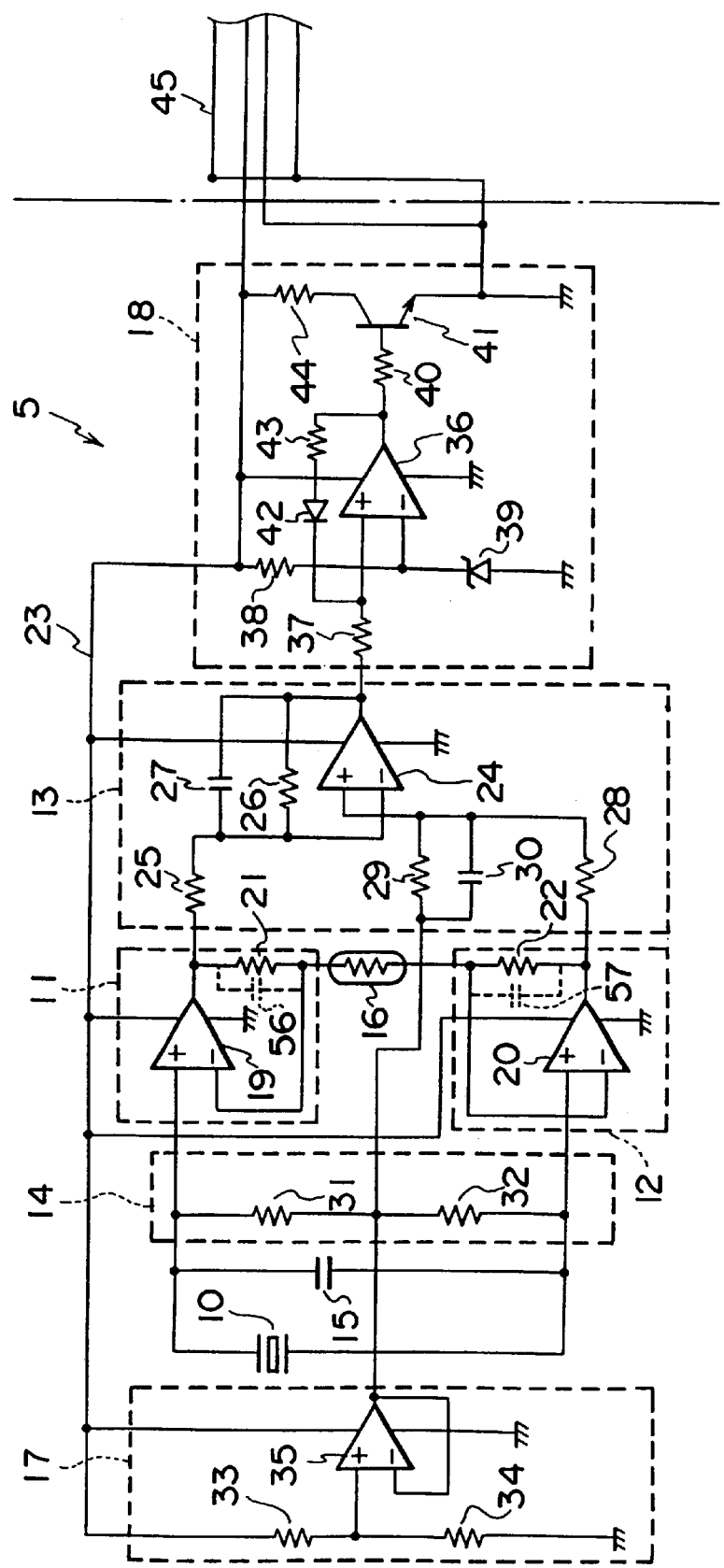
FIG. 2 is a circuit diagram showing an example of a front acceleration sensor in FIG. 1.

FIG. 2 is a circuit diagram showing an example of the front acceleration sensor 5 of FIG. 1.

The front acceleration sensor 5 includes a piezo-electric element 10 for detecting an acceleration, an amplifier circuit having first and second non-inverting amplifier circuits 11 and 12 and a differential amplifier circuit 13, a bias resistor circuit 14, a condenser 15, a temperature compensation element 16 as temperature compensation means, a reference voltage circuit 17 and a comparison circuit 18.

The first non-inverting amplifier circuit 11 of the amplifier circuit has a bipolar transistor type operational amplifier 19 and a resistor 21 inserted between a negative input terminal and an output terminal of the amplifier 19. The second non-inverting amplifier circuit 12 of the amplifier circuit has a bipolar transistor type operational amplifier 20 and a resistor 22 inserted between a negative input terminal and an output terminal of the amplifier 20. An operating power source of the amplifiers 19 and 20 is supplied from a sensor power supply line 23. As described below, the control unit 1 supplies a predetermined constant voltage to the sensor power supply line 23 by way of the receiving circuit 3. A positive input terminal of the operational amplifier 19 of the first non-inverting amplifier circuit 11 is connected to one end of the piezo-electric element 10, and a positive input terminal of the operational amplifier 20 of the second non-inverting amplifier circuit 12 is connected to the other end of the piezo-electric element 10. By this, voltage outputs at both ends of the piezo-electric element 10 are non-inversion amplified and converted to low impedances respectively by the first and second non-inverting amplifier circuits 11 and 12. Since the voltage outputs of the piezo-electric element 10 are lowered by a parallel insertion of the condenser 15 to the piezo-electric element 10 as described below, the resistors 21 and 22 of the first and second non-inverting amplifier circuits 11 and 12 are set to relatively high value so that decrement in the voltage outputs of the piezo-electric element 10 can be supplemented by gains of the operational amplifiers 19 and 20.

The differential amplifier circuit 13 of the amplifier circuit has a bipolar transistor type operational amplifier 24. An operating power source of the amplifier 24 is supplied from the sensor power supply line 23. A negative input terminal of the amplifier 24 is connected through a resistor 25 to the output terminal of the operational amplifier 19 of the first non-inverting amplifier circuit 11, and is also connected to an output terminal of the amplifier 24 through a parallel connection of a resistor 26 and a condenser 27. A positive input terminal of the amplifier 24 is connected through a resistor 28 to the output terminal of the operational amplifier 20 of the second non-inverting amplifier circuit 12, and also receives a reference potential from the reference voltage circuit 17 through a parallel connection of a resistor 29 and a condenser 30. The differential amplifier circuit 13 differentially amplifies and integrates the outputs of the first and second non-inverting amplifier circuits 11 and 12, and outputs an integrated value of the acceleration detected by the piezo-electric element 10. As described below, the reference potential given from the reference voltage circuit 17 to the differential amplifier circuit 13 is given by way of a reference voltage buffer amplifier 35 so as to match with output impedances of the first and second non-inverting amplifier circuits 11 and 12. By this, a common mode rejection ratio of the differential amplifier circuit 13 becomes large. Accordingly, an influence of offset voltage due to the gain increment of the non-inverting amplifier circuits 11 and 12 is suppressed by the differential amplifier circuit 13.

The bias resistor circuit 14 has a bias resistor 31 inserted between the positive input terminal of the first non-inverting amplifier circuit 11 and the reference potential of the reference voltage circuit 17, and a bias resistor 32 inserted between the positive input terminal of the second non-inverting amplifier circuit 12 and the reference potential of the reference voltage circuit 17. The condenser 15 is inserted in parallel with the piezo-electric element 10 so that a composite capacity with the piezo-electric element 10 increases. By this, a lower cut-off frequency is lowered without increasing resistor values of the bias resistors 31 and 32, and hereby velocity variations due to collision can be detected more easily. From the viewpoint of this, it is desirable to give a frequency even below 10 Hz, for example. When the bias resistors 31 and 32 are set, for example, to high resistance values of about 100MΩ in order to lower the lower cut-off frequency, it is not possible to use these resistors under a normal atmosphere. Also, when the bias resistor 31 and 32 are set to the high resistance values as mentioned above, a DC voltage may be applied to the piezo-electric element 10 by influence of bias current, and thereby a migration may be caused in the piezo-electric element 10. Because of this, it is desirable to set the bias resistors 29 and 30 to about 1MΩ. Since the lower cut-off frequency is determined by the composite capacity of the piezo-electric element 10 and the condenser 15 and the resistance values of the bias resistors 31 and 32, a capacity value of the condenser 15 is set so that the bias resistors 31 and 32 are about 1MΩ, and furthermore, so that the lower cut-off frequency is a low value below 10 Hz, for example. Although the voltage outputs of the piezo-electric element 10 are decreased by the parallel insertion of the condenser 15 to the piezo-electric element 10, this is supplemented by the gain increment of the first and second non-inverting amplifier circuits 11 and 12 as mentioned above. Also, since an output-temperature characteristic of the piezo-electric element 10 becomes apparent by the parallel insertion of the condenser 15, the temperature compensation element 16 is provided in order to compensate the output-temperature characteristic of the piezo-electric element 10. The output-temperature characteristic of the piezo-electric element 10 is a positive characteristic. Therefore, the outputs of the piezo-electric element 10 are increased when temperature rises, and are decreased when temperature drops.

The temperature compensation element 16 is inserted between the negative input terminal of the operational amplifier 19 of the first non-inverting amplifier circuit 11 and the negative input terminal of the operational amplifier 20 of the second non-inverting amplifier circuit 12. In this example, the temperature compensation element 16 is a posistor. The posistor 16 lowers the gains of the first and second non-inverting amplifier circuits 11 and 12 when temperature rises, and raises these gains when temperature drops. By this, the outputs of the piezo-electric element 10 is compensated against temperature variations. Since the gains of the non-inverting amplifier circuits 11 and 12 are adjusted by a single temperature compensation element 16, decrement in number of elements and simplification of circuit composition can be achieved.

The reference voltage circuit 17 has a series connection of voltage dividing resistors 33 and 34 inserted between the sensor power supply line 23 and the ground, and the reference voltage buffer amplifier 35 composed of a bipolar transistor type operational amplifier. The buffer amplifier 35 receives a voltage divided by the voltage dividing resistors 33 and 34 as a positive input, and a negative input terminal is connected to its output terminal. The reference voltage circuit 17 gives the reference potential to the differential amplifier circuit 13 and the bias resistor circuit 14 byway of the buffer amplifier 35. Thus, matching with the output impedances of the non-inverting amplifier circuits 11 and 12 can be attained, and thereby the common mode rejection ratio of the differential amplifier circuit 13 is increased. An operating power source of the reference voltage buffer amplifier 35 is supplied from the sensor power supply line 23. Since the sensor output of the front acceleration sensor 5 is transmitted as current variations in the sensor power supply line 23 to the control unit 1 as described below, the voltage dividing resistors 33 and 34 are set to relatively high values of some KΩ so that a current flowing through the resistors 33 and 34 to the ground becomes small. Incidentally, in this example the reference potential is given to the bias resistor circuit 14 by way of the reference voltage buffer amplifier 35, but it is also acceptable to directly give the divided voltage of the resistors 33 and 34 to the bias resistor circuit 14.

The comparison circuit 18 has a comparator 36 composed of a bipolar transistor type operational amplifier. An operating power source of the comparator 36 is supplied from the sensor power supply line 23. A positive input terminal of the comparator 36 inputs the output of the differential amplifier circuit 13 through a resistor 37. A negative input terminal of the comparator 36 inputs a reference voltage Eth which is given by a series connection of a resistor 38 and a Zener diode 39 inserted between the sensor power supply line 23 and the ground. The reference voltage Eth is a threshold value for detecting a predetermined collision acceleration, and is set experimentally based on a collision acceleration requiring to drive the occupant protection device 7, for example. An output terminal of the comparator 36 is connected to a base of a switching transistor 41 through a resistor 40, and is also connected to its positive input terminal through a series connection of a diode 42 and a resistor 43. The diode 42 is inserted so that the direction from the output terminal toward the positive input terminal becomes the forward direction. The diode 42 and the resistors 37 and 43 constitute a chattering prevention circuit of the comparator 36. That is, when the output of the differential amplifier circuit 13 exceeds the reference voltage Eth, a High level output of the comparator 36 is provided as feedback to the positive input terminal. By this, chattering of the comparator 36 is prevented. An emitter of the switching transistor 41 is grounded, and its collector is connected to the sensor power supply line 23 through a resistor 44. In the comparison circuit 18 which is composed as described above, when the output of the differential amplifier circuit 13 namely an integrated value of acceleration is smaller than the reference voltage Eth, the output of the comparator 36 is a Low level, and the switching transistor 41 is in an Off state. When the output of the differential amplifier circuit 13 is larger than the reference voltage Eth, the comparator 36 outputs a High level signal indicating a detection of the predetermined collision acceleration, and the switching transistor 41 is made On. By this, a current flows through the resistor 44 and the transistor 41 from the sensor power supply line 23 to the ground, and thereby a current value in the sensor power supply line 23 becomes higher. That is, the detection signal representative of the detection of the predetermined collision acceleration is output as a current variation in the sensor power supply line 23.

The sensor power supply line 23 of the front acceleration sensor 5 is connected to the receiving circuit 3 of the control unit 1 by way of a transmission cable 45, and receives a predetermined constant voltage from a unit power supply line 54 (shown in FIG. 3) in the control unit 1 by way of the receiving circuit 3. In this example, from the viewpoint of noise prevention, a twisted pair cable is used as the transmission cable 45. The detection signal of the front acceleration sensor 5 is provided to the receiving circuit 3 of the control unit 1 through the twisted pair cable 45 as the current variation in the sensor power supply line 23. Incidentally, since the operational amplifiers 19, 20, 24, 35 and 36 in the front acceleration sensor 5 operate with nearly a constant current, the operating current of the operational amplifiers 19, 20, 24, 35 and 36 does not affect the sensor output given as the current variation.

Figure 3:
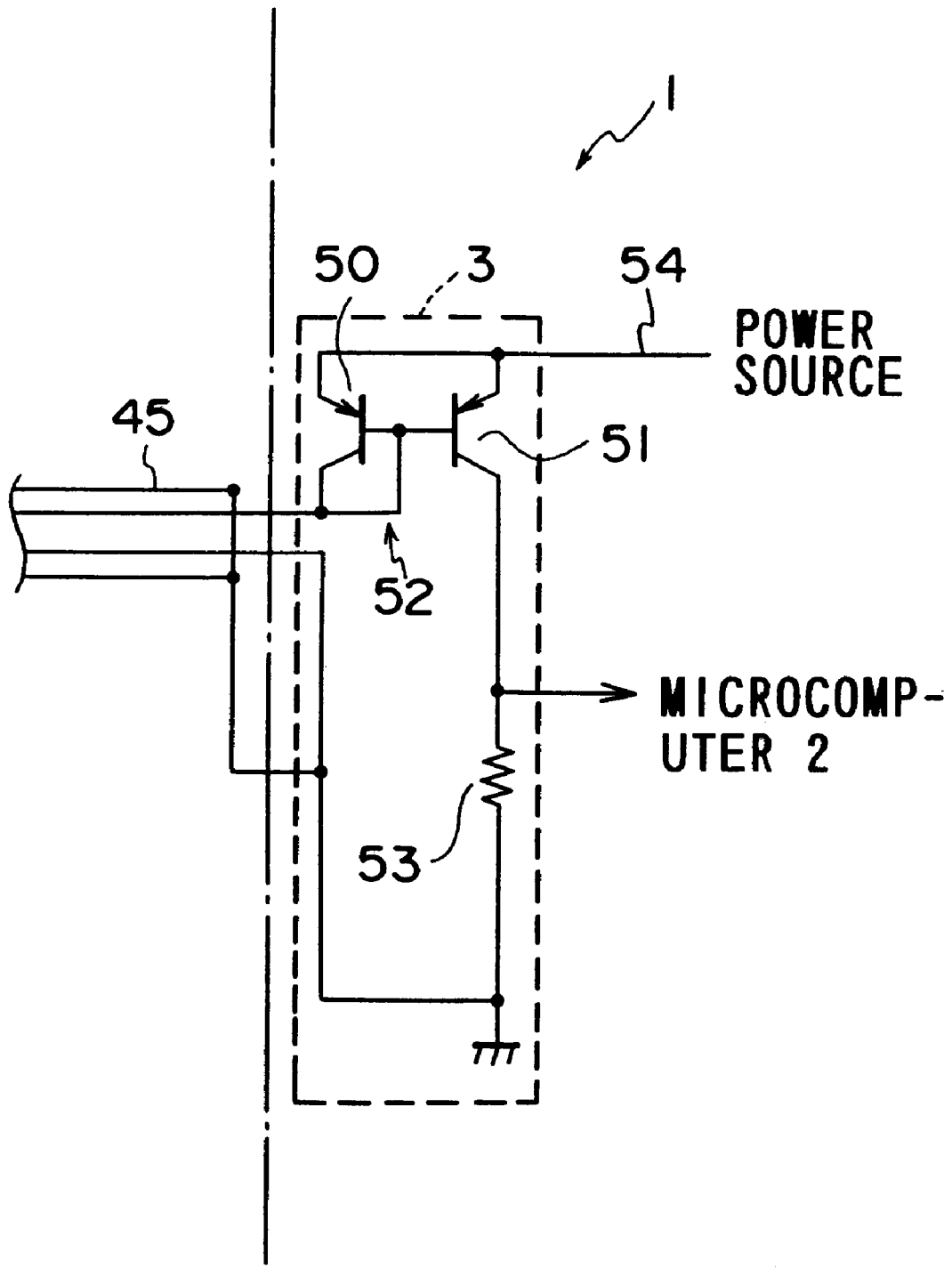
FIG. 3 is a circuit diagram showing an example of a receiving circuit of a control unit in FIG. 1.

FIG. 3 is a circuit diagram showing an example of the receiving circuit 3 in FIG. 1. The receiving circuit 3 has a current mirror circuit 52 having a pair of transistors 50 and 51, and a detection resistor 53. One transistor 50 of the current mirror circuit 52 at its emitter is connected to the unit power supply line 54, at its collector is connected to the sensor power supply line 23 of the front acceleration sensor 5 by way of the twisted pair cable 45, and at its base is connected to the collector and a base of the other transistor 51. An emitter of the other transistor 51 is connected to the unit power supply line 54, and its collector is grounded through the detection resistor 53. The detection signal from the front acceleration sensor 5 is given as a voltage signal to the microcomputer 2 by the detection resistor 53.

FIG. 4 is an explanatory drawing for explaining an operation of the front acceleration sensor 5 of FIG. 2. In FIG. 4, a reference letter (a) shows the output of the differential amplifier circuit 13 namely an integrated value of acceleration, a reference letter (b) shows On/Off of the switching transistor 41 of the comparison circuit 18, and a reference letter (c) shows a current variation in the sensor power supply line 23.

When the piezo-electric element 10 does not detect any acceleration, the differential amplifier circuit 13 gives a prescribed voltage output lower than the reference voltage Eth of the comparison circuit 18 based on the reference potential of the reference voltage circuit 17. Therefore, the output of the comparator 36 is the Low level, the switching transistor 41 is in the Off state, and a current flowing through the sensor power supply line 23 and the unit power supply line 54 is a certain value and does not vary. In the receiving circuit 3 of the control unit 1, the pair of transistors 50 and 51 give a current to the detection resistor 53 based on base-emitter voltages according to the certain current flowing through the unit power supply line 54. Thus, a prescribed voltage signal indicating that the detection signal is not provided from the front acceleration sensor 5 is given by way of the detection resistor 53 to the microcomputer 2. The microcomputer 2 inputs the prescribed voltage signal by way of A/D conversion.

On the other hand, when the piezo-electric element 10 detects an acceleration, the differential amplifier circuit 13 outputs a voltage representative of an integrated value of the acceleration as shown in FIG. 4(a). When the output of the differential amplifier circuit 13 exceeds the reference voltage Eth, the comparator 36 of the comparison circuit 18 outputs the High level signal, and the switching transistor 41 is made On as shown in FIG. 4(b). Hereby, a current flows through the resistor 44 and the transistor 41 from the sensor power supply line 23 to the ground, a current value in the sensor power supply line 23 becomes higher as shown in FIG. 4(c), and thereby the detection signal is provided to the receiving circuit 3 of the control unit 1. In the receiving circuit 3, a base-emitter voltage of one transistor 50 of the current mirror circuit 52 varies according to the current variation in the unit power supply line 54 namely the detection signal of the front acceleration sensor 5. By this, the other transistor 51 gives the detection resistor 53 a collector current so that a base-emitter voltage of the other transistor 51 is the same potential as the base-emitter voltage of one transistor 50. By this, the detection signal of the front acceleration sensor 5 is given as a voltage signal by the detection resistor 53, and the microcomputer 2 inputs the voltage signal by way of A/D conversion.

Although in the front acceleration sensor 5 of FIG. 2 the differential amplifier circuit 13 only has the integrating function, this is not intended to limit the scope of the invention. Together with the differential amplifier circuit 13 or instead of the differential amplifier circuit 13, the first and second non-inverting amplifier circuits 11 and 12 may have an integrating function. In this case, as shown by broken lines in FIG. 2, condensers 56 and 57 are each inserted in parallel with the resistors 21 and 22. By this, the non-inverting amplifier circuits 11 and 12 having the integrating function are constituted.

According to the composition of FIG. 2, the output fluctuations of the piezo-electric element 10 due to variations in ambient temperature are compensated by the gain adjustments of the non-inverting amplifier circuits 11 and 12 by means of the temperature compensation element 16. Because of this, even when the front acceleration sensor 5 is provided in a place with extreme ambient temperature variations such that it directly receives heat from the vehicle engine, the sensor output of the front acceleration sensor 5 does not fluctuate by variations in ambient temperature.

Also, by inserting the condenser 15 in parallel with the piezo-electric element 10, the composite capacity is increased. By this, the lower cut-off frequency can be lowered without increasing the resistance values of the bias resistors 31 and 32. Hereby, since a lower frequency component is given to the comparison circuit 18, a collision detection in the comparison circuit 18 becomes easy, and the detection signal can be exactly output. Also, it is not necessary to set the bias resistors 31 and 32 to such high resistance values that cannot be used in an ordinary atmosphere. Further, the migration in the piezo-electric element 10, occurring by setting the bias resistors 31 and 32 to high resistance values, can be prevented.

Also, by providing the output of the comparator 36 as feedback to the input signal, the chattering of the comparator 36 is prevented. Because of this, circuit composition can be simplified as compared with a case where a chattering is prevented by varying a reference voltage of a comparator.

Also, the detection signal of the front acceleration sensor 5 is transmitted to the receiving circuit 3 of the control unit 1 as the current variation in the power supply lines 23, 45 and 54. Because of this, it is not necessary to provide a signal line. Also, since it is not necessary to use a ground potential by car body grounding as a reference, noise prevention can be done more effectively.

Further, the receiving circuit 3 of the control unit 1 is formed with the current mirror circuit 52 comprising the transistors 50 and 51. Because of this, since temperature characteristics of the base-emitter voltages of the transistors 50 and 51 are cancelled, no temperature compensation means is required. Also, since the receiving circuit 3 operates with a voltage supplied to the front acceleration sensor 5, there is no need to prepare another operating voltage, and the composition of the receiving circuit 3 can be simplified in the extreme.

Reverting to FIG. 1, the room acceleration sensor 6 is provided on the floor tunnel in the car room together with the control unit 1. The room acceleration sensor 6 detects an acceleration transmitted through the floor tunnel, and gives the microcomputer 2 an acceleration signal Gt representative thereof as the sensor output. Since the room acceleration sensor 6 is provided on the floor tunnel in the car room, in case of a collision in which a collision acceleration transmitted to the floor tunnel is weakened because of an impact absorption by a crush of the car body, there is a fear that the collision acceleration detected by the room acceleration sensor 6 is small. However, in case of a collision, such as a head-on collision, in which the collision acceleration is easily transmitted to the floor tunnel, the collision acceleration can be detected early by the room acceleration sensor 6. As the room acceleration sensor 6, a well-known acceleration sensor can be used.

The microcomputer 2 of the control unit 1 executes the following controls according to flow diagrams of FIG. 5 and FIG. 6 described below. When the detection signal is not given from the front acceleration sensor 5, the microcomputer 2 sets a first threshold value Vth1, and decides whether an integrated value $\Delta Vt$ of the acceleration signal Gt of the room acceleration sensor 6 is larger than the first threshold value Vth1. And, when the integrated value $\Delta Vt$ is larger than the first threshold value vth1, the microcomputer 2 recognizes that the vehicle is in a collision requiring to drive the occupant protection device 7, and outputs the collision detection signal to the drive circuit 4. When the detection signal is given from the front acceleration sensor 5, the microcomputer 2 sets a second threshold value Vth2 lower than the first threshold value Vth1, and decides whether the vehicle is in the collision based on a comparison between the integrated value $\Delta Vt$ and the second threshold value Vth2. When the integrated value $\Delta Vt$ exceeds the second threshold value Vth2, the microcomputer 2 recognizes that the vehicle is in the collision, and outputs the collision detection signal to the drive circuit 4. If the integrated value $\Delta Vt$ is smaller than the second threshold value Vth2, the microcomputer further decides whether the vehicle is in the collision based on a comparison between the integrated value $\Delta Vt$ and the first threshold value Vth1.

Figure 5:
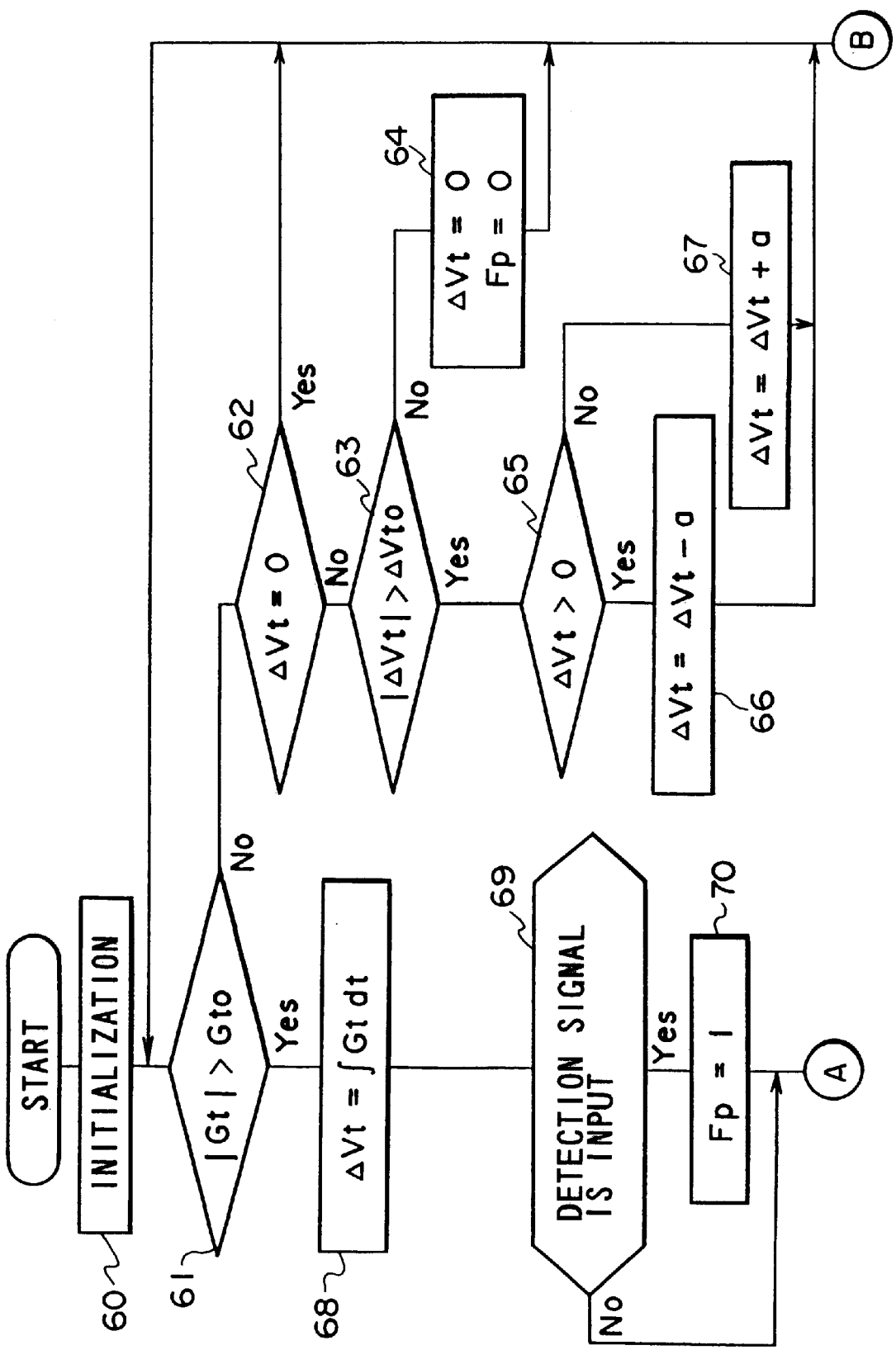
FIG. 5 and FIG. 6 are flow diagrams of a microcomputer of FIG. 1.
Figure 6:
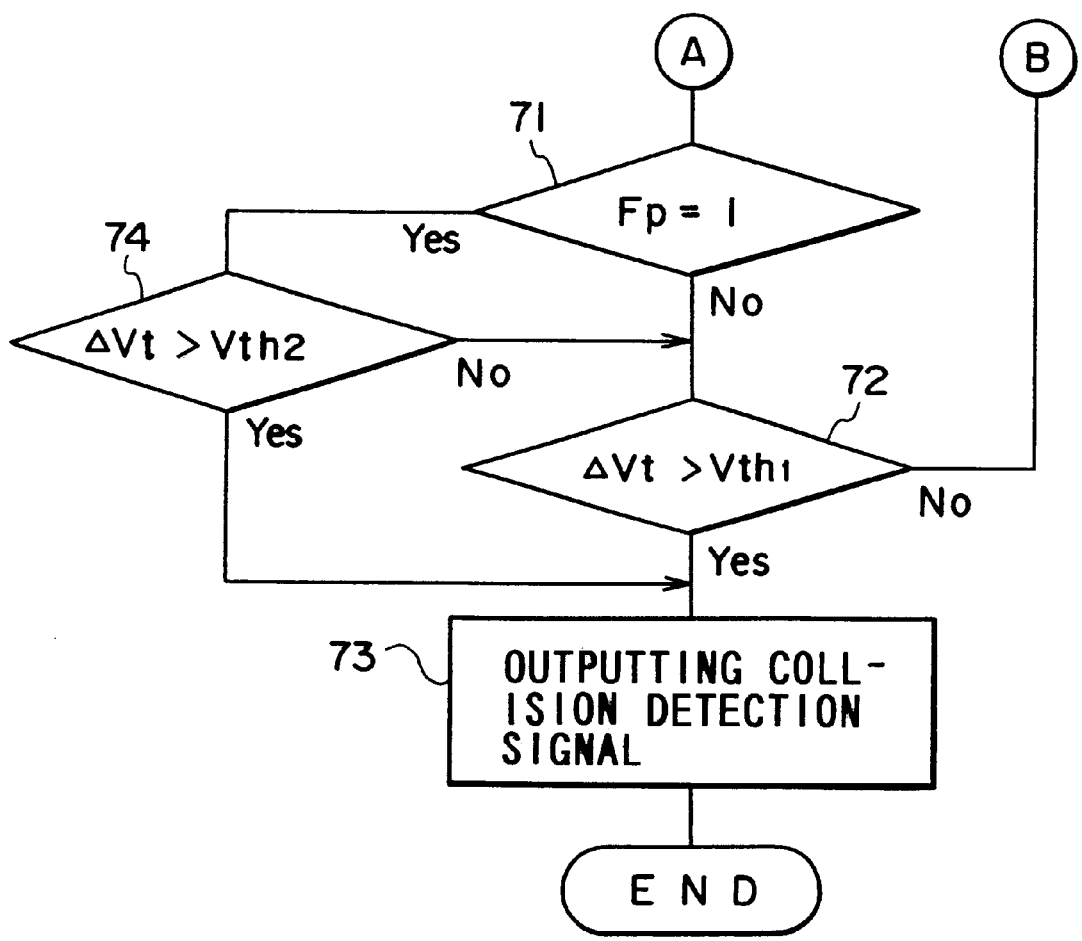

FIG. 5 and FIG. 6 are flow diagrams of the microcomputer 2 of FIG. 1. Terminals A and B of FIG. 6 are connected to terminals having the same signs A and B of FIG. 5.

When a power source is applied by turning On an ignition switch (not shown in the drawings) of the vehicle, the microcomputer 2 starts the control processing according to the flow diagrams, and enters a step 61 after an initialization in a step 60.

In the step 61, the microcomputer 2 inputs the acceleration signal Gt of the room acceleration sensor 6, and decides whether an absolute value of the acceleration signal Gt is larger than a reference value Gto. The reference value Gto is a reference value for deciding whether to integrate the acceleration signal Gt. The reference value Gto is set so that an integration of the acceleration signal Gt is not performed against a non-collision acceleration of the vehicle occurring by a sudden braking and so on.

In the step 61, when the absolute value of the acceleration signal Gt is smaller than the reference value Gto, the microcomputer 2 enters a reset processing of steps 62–67, and returns to the step 61 after the reset processing. In the step 62 of the reset processing, whether the integrated value $\Delta Vt$ of the acceleration signal Gt is "0" is decided. The integrated value $\Delta Vt$ is computed in a step 68 described below. If the absolute value of the acceleration signal Gt has not exceeded the reference value Gto yet after starting the control processing, the integrated value $\Delta Vt$ is the initial value namely "0". Accordingly, the microcomputer 2 directly returns from the step 62 to the step 61. When the integrated value $\Delta Vt$ is not "0", the microcomputer 2 enters from the step 62 to the step 63, and decides whether the absolute value of the integrated value ΔVt is larger than are set reference value ΔVto. The reset reference value ΔVto is a reference value for deciding whether to reset the integrated value ΔVt to "0". In this embodiment, the reset reference value ΔVto is set as a<ΔVto<2a. "a" is a subtraction value described below. When the absolute value of the integrated value ΔVt is smaller than the reference value ΔVto, the microcomputer 2 enters from the step 63 to the step 64, resets the integrated value ΔVt and a front flag Fp to "0", and returns to the step 61. The front flag Fp is described later. Ad When the absolute value of the integrated value ΔVt is larger than the reference value ΔVto, the microcomputer 2 enters from the step 63 to the step 65 and decides whether the integrated value ΔVt is larger than "0". When the integrated value ΔVt is larger than "0", the subtraction value "a" is subtracted from the integrated value ΔVt in the step 66. When the integrated value ΔVt is smaller than "0", the subtraction value "a" is added to the integrated value ΔVt in the step 67. Thereafter, the microcomputer 2 returns to the step 61.

Since the acceleration signal Gt of the room acceleration sensor 6 fluctuate by resonance and so on, the acceleration signal Gt may temporally become smaller than the reference value Gto after becoming larger than the value Gto while detecting a collision acceleration. In such a case, in this embodiment, a prior integrated value is not immediately reset to "0", but it is processed gradually toward the rest direction by means of the subtraction value "a". Because of this, when the acceleration signal Gt exceeds the reference value Gto again, the integral processing can be continued from the prior integrated value, and thereby a collision detection can be performed quickly. Incidentally, the integrated value ΔVt becomes smaller than "0" in the step 65 when the vehicle is collided from behind, for example. In such a case, since the integrated value ΔVt becomes a negative value, it is processed toward the rest direction by the step 67. Thereby, a continuance of an unstable signal is prevented.

On the other hand, in the step 61, when the absolute value of the acceleration signal Gt is larger than the reference value Gto, the microcomputer 2 enters a step 68 and computes the integrated value ΔVt of the acceleration signal Gt. Thereafter, the microcomputer 2 enters a step 69 and decides whether the detection signal representative of detection of the predetermined collision acceleration is input from the front acceleration sensor 5. If the detection signal is input, the microcomputer 2 sets the front flag Fp to "1" in a following step 70, and enters a step 71 of FIG. 6. If the detection signal is not input, the microcomputer 2 directly enters from the step 69 to the step 71 of FIG. 6. The front flag Fp is a flag for indicating whether the detection signal from the front acceleration sensor 5 has been input. The flag Fp is reset to "0" in the initialization and the step 64.

In the step 71 of FIG. 6, the microcomputer 2 decides whether the front flag Fp is "1". When the flag Fp is not "1", namely if the detection signal from the front acceleration sensor 5 is not input, the microcomputer 2 enters a step 72. In the step 72, whether the integrated value ΔVt of the acceleration signal Gt of the room acceleration sensor 6 is larger than the first threshold value Vth1 is decided. When the integrated value ΔVt is not larger than the first threshold value Vth1, the microcomputer 2 returns to the step 61 of FIG. 5, and the aforementioned control processing is repeated. When the integrated value ΔVt is larger than the first threshold value Vth1, the microcomputer 2 enters a step 73, outputs the collision detection signal to the drive circuit 4, and finishes the control processing. On the other hand, in the step 71, when the flag Fp is "1", namely if the detection signal from the front acceleration sensor 5 is input, the microcomputer 2 enters from the step 71 to a step 74, sets the second threshold value Vth2 lower than the first threshold value Vth1, and decides whether the integrated value ΔVt is larger than the second threshold value Vth2. When the integrated value ΔVt is larger than the second threshold value Vth2, the microcomputer 2 enters from the step 74 to the step 73, outputs the collision detection signal to the drive circuit 4, and finishes the control processing. When the integrated value ΔVt is not larger than the second threshold value Vth2, the microcomputer 2 enters from the step 74 to the aforementioned step 72, and further decides whether the integrated value ΔVt is larger than the first threshold value Vth1. When the collision detection signal is output to the drive circuit 4 in the step 73, the drive circuit 4 outputs the drive signal to the occupant protection device 7, and thereby the occupant protection device 7 such as an airbag is driven.

According to the first embodiment described above, the front acceleration sensor 5 outputs the detection signal when detecting the predetermined collision acceleration. When the detection signal is output, the second threshold value Vth2 lower than the first threshold value Vth1 is set, and whether the integrated value ΔVt of the acceleration signal Gt of the room acceleration sensor 6 exceeds the second threshold value Vth2 is decided. The front acceleration sensor 5, as described above, is provided in the front part of the vehicle. Hence, even in case of a collision in which the collision acceleration transmitted to the room acceleration sensor 6 provided on the floor tunnel is weakened, the front acceleration sensor 5 can detect the collision acceleration early and give the detection signal to the control unit 1. By this, since the second threshold value Vth2 lower than the first threshold value Vth1 is set, the integrated value ΔVt of the room acceleration sensor 6 is larger than the second threshold value Vth2 without causing a delay, and the occupant protection device 7 is driven exactly. Also, unless the integrated value ΔVt of the room acceleration sensor 6 exceeds the second threshold value Vth2 even if the detection signal has been input from the front acceleration sensor 5, the control unit 1, without outputting the collision detection signal to the drive circuit 4, decides whether the integrated value ΔVt exceeds the first threshold value Vth1. That is, unless the integrated value ΔVt of the room acceleration sensor 6 increases, the control unit 1 does not drive the occupant protection device 7. Hence, it can be prevented that the occupant protection device 7 is driven by the detection signal due to malfunction of the front acceleration sensor 5.

A sensitivity of the front acceleration sensor 5 can easily be changed by changing the reference voltage Eth. Therefore, a sensitivity adjustment according to car types and so on is easy, and a dispersion in sensitivity can also be reduced.

Figure 7:
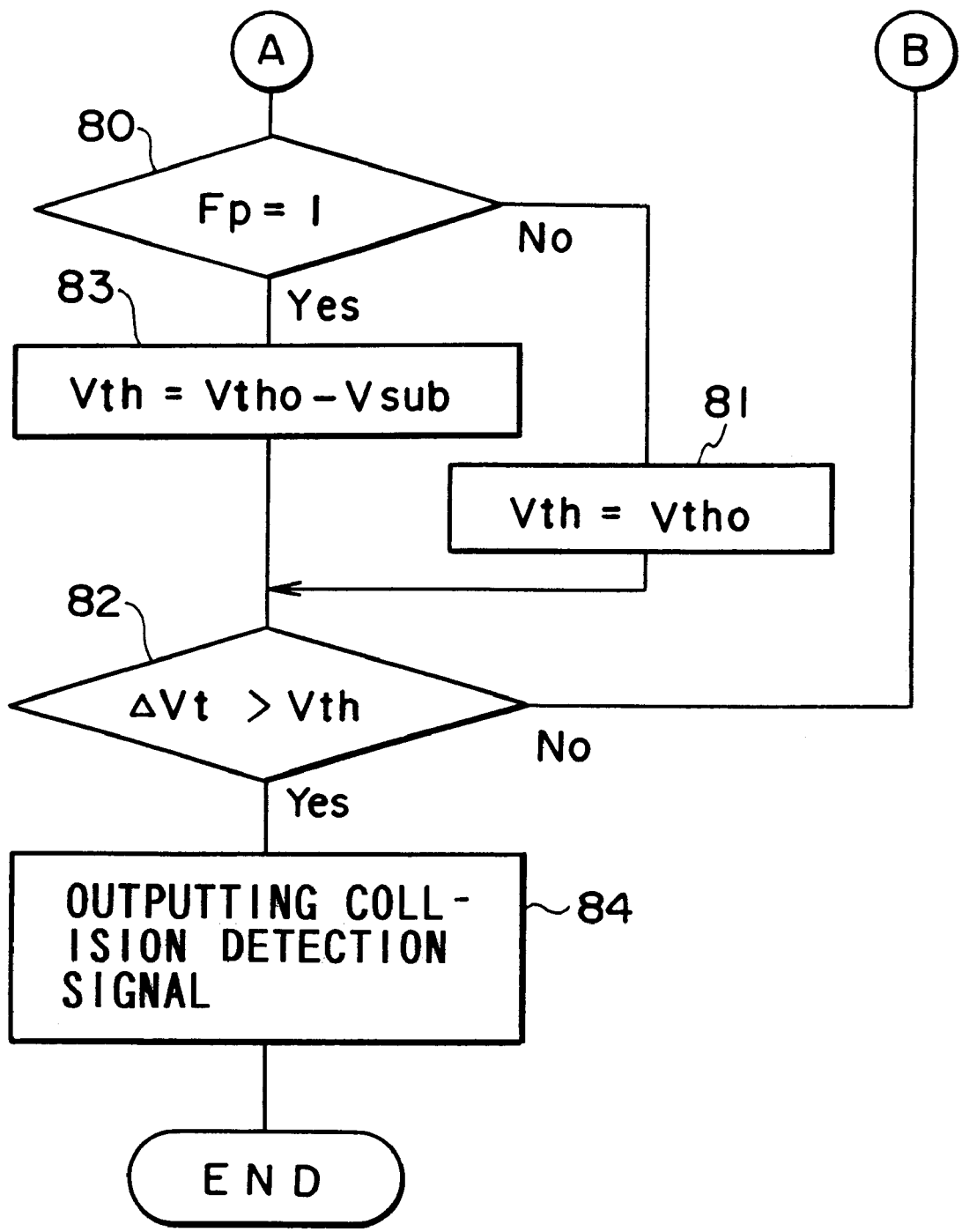
FIG. 7 is a flow diagram of the microcomputer of FIG. 1 showing a second embodiment of the present invention, and constitutes the flow diagrams of the microcomputer together with FIG. 5.

FIG. 7 is a flow diagram of the microcomputer 2 of FIG. 1 showing a second embodiment of the present invention. FIG. 7 is applied to the microcomputer 2 in place of the flow diagram of FIG. 6. Terminals A and B of FIG. 7 are connected to terminals having the same signs A and B of FIG. 5. That is, FIG. 7 constitutes the flow diagrams of the microcomputer 2 together with FIG. 5.

The microcomputer 2 of the control unit 1 enters from the step 69 or the step 70 of FIG. 5 to a step 80 of FIG. 7, and decides whether the front flag Fp is "1". When the flag Fp is not "1", the microcomputer 2 enters from the step 80 to a step 81, sets a basic threshold value Vth as a threshold value Vth toward the integrated value ΔVt of the room acceleration sensor 6, and goes to a step 82. On the other hand, when the flag Fp is "1" in the step 80, the microcomputer 2 enters a step 83 computes a low threshold value Vtho-Vsub lower than the basic threshold value Vtho by subtracting a decrement value Vsub from the basic threshold value Vtho, and sets the low threshold value Vtho-Vsub as the threshold value Vth. Thereafter, the microcomputer 2 enters the step 82. In the step 82, whether the integrated value ΔVt of the room acceleration sensor 6 is larger than the threshold value Vth is decided. When the integrated value ΔVt is not larger than the threshold value Vth, the microcomputer 2 returns to the step 61 of FIG. 5. When the integrated value ΔVt is larger than the threshold value Vth, the microcomputer 2 outputs the collision detection signal to the drive circuit 4 in a step 84, and finishes the control processing. Composition and operation of other portions is as described in relation to the first embodiment.

According to the second embodiment described above, if the detection signal of the front acceleration sensor 5 is input, the low threshold value Vtho-Vsub lower than the basic threshold value Vtho is set by subtracting the decrement value Vsub from the basic threshold value Vtho, as the threshold value Vth against the integrated value ΔVt of the room acceleration sensor 6. Because of this, even in case of a collision in which the collision acceleration transmitted to the room acceleration sensor 6 is weakened, the integrated value ΔVt of the room acceleration sensor 6 is larger than the threshold value Vth without causing a delay, and the occupant protection device 7 is driven exactly. In addition, unless the integrated value ΔVt of the room acceleration sensor 6 increases even if the detection signal has been input from the front acceleration sensor 5, the control unit 1 does not drive the occupant protection device 7. Hence, it can be prevented that the occupant protection device 7 is driven by the detection signal due to malfunction of the front acceleration sensor 5.

In the first and second embodiments, as described above, the front acceleration sensor 5 is provided near the radiator of the center part of the vehicle front. Hence, even in case of a collision in which transmission of the collision acceleration to the room acceleration sensor 6 is weakened, for example, a center pole collision in which a center part of the vehicle front collides against a pole such as an electric light pole, and an under-ride collision in which the vehicle front goes under a back part of a truck, the front acceleration sensor 5 can detect the collision acceleration early and give the detection signal to the control unit 1.

Although one front acceleration sensor is used in the first and second embodiments, this is not intended to limit the scope of the invention. The present invention can be also applied to a case in which a plurality of front acceleration sensors are used, as shown in FIG. 8 mentioned below, for example.

Figure 8:
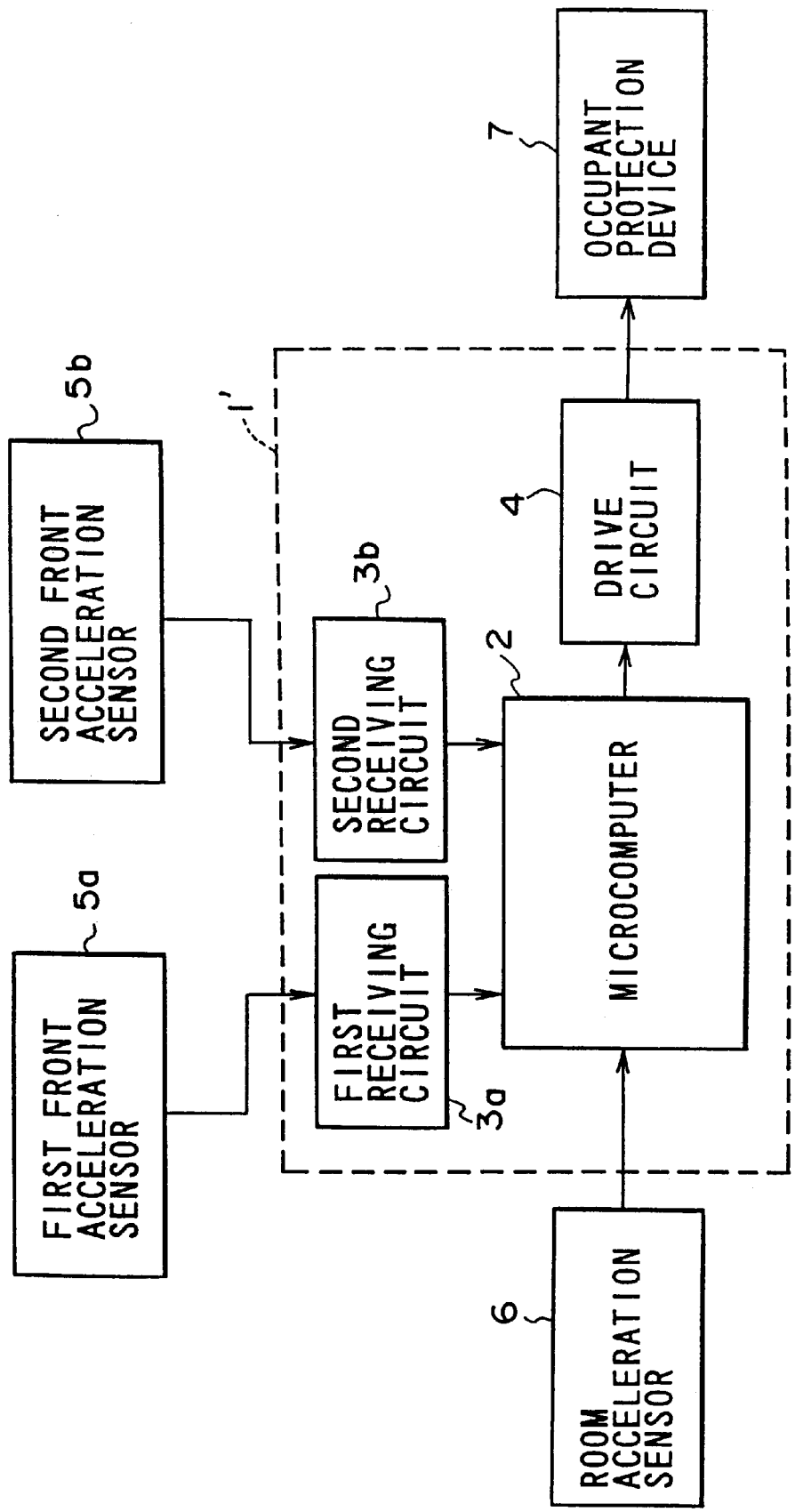
FIG. 8 is a block diagram showing a third embodiment of the present invention.

FIG. 8 is a block diagram showing a third embodiment of the present invention. In the third embodiment, first and second front acceleration sensors 5a and 5b are provided.

The front acceleration sensors 5a and 5b are provided at front parts of a vehicle, for example, at left and right ends of a radiator mount maintaining a radiator, respectively, so that the sensors 5a and 5b can detect a collision acceleration early in case of a collision, such as an offset collision and an oblique collision. Therefore, for example, the first front acceleration sensor 5a is positioned near a left fender of the front part of the vehicle, and the second front acceleration sensor 5b is positioned near a right fender of the front part of the vehicle. The front acceleration sensors 5a and 5b each have the circuit composition shown in FIG. 2, and output the detection signals when detecting the predetermined collision acceleration, respectively. The detection signal of the first front acceleration sensor 5a is given to the microcomputer 2 by way of a first receiving circuit 3a of a control unit 1'. The detection signal of the second front acceleration sensor 5b is given to the microcomputer 2 by way of a second receiving circuit 3b of the control unit 1'. The first and second receiving circuits 3a and 3b each have the circuit composition shown in FIG. 3. The microcomputer 2 of the control unit 1', in the step 69 of FIG. 5, decides whether the detection signal is input from at least one of the first and second front acceleration sensors 5a and 5b. Composition and operation of other portions is as described in relation to the first or second embodiment.

According to the third embodiment described above, the first and second front acceleration sensors 5a and 5b are provided near the right and left portions of the radiator of the vehicle front, respectively. Hence, even in case of a collision, such as an offset collision and an oblique collision, in which transmission of the collision acceleration to the room acceleration sensor 6 provided on the floor tunnel is weakened, at least one of the front acceleration sensors 5a and 5b can detect the collision acceleration early and give the detection signal to the control unit 1.

Figure 9:
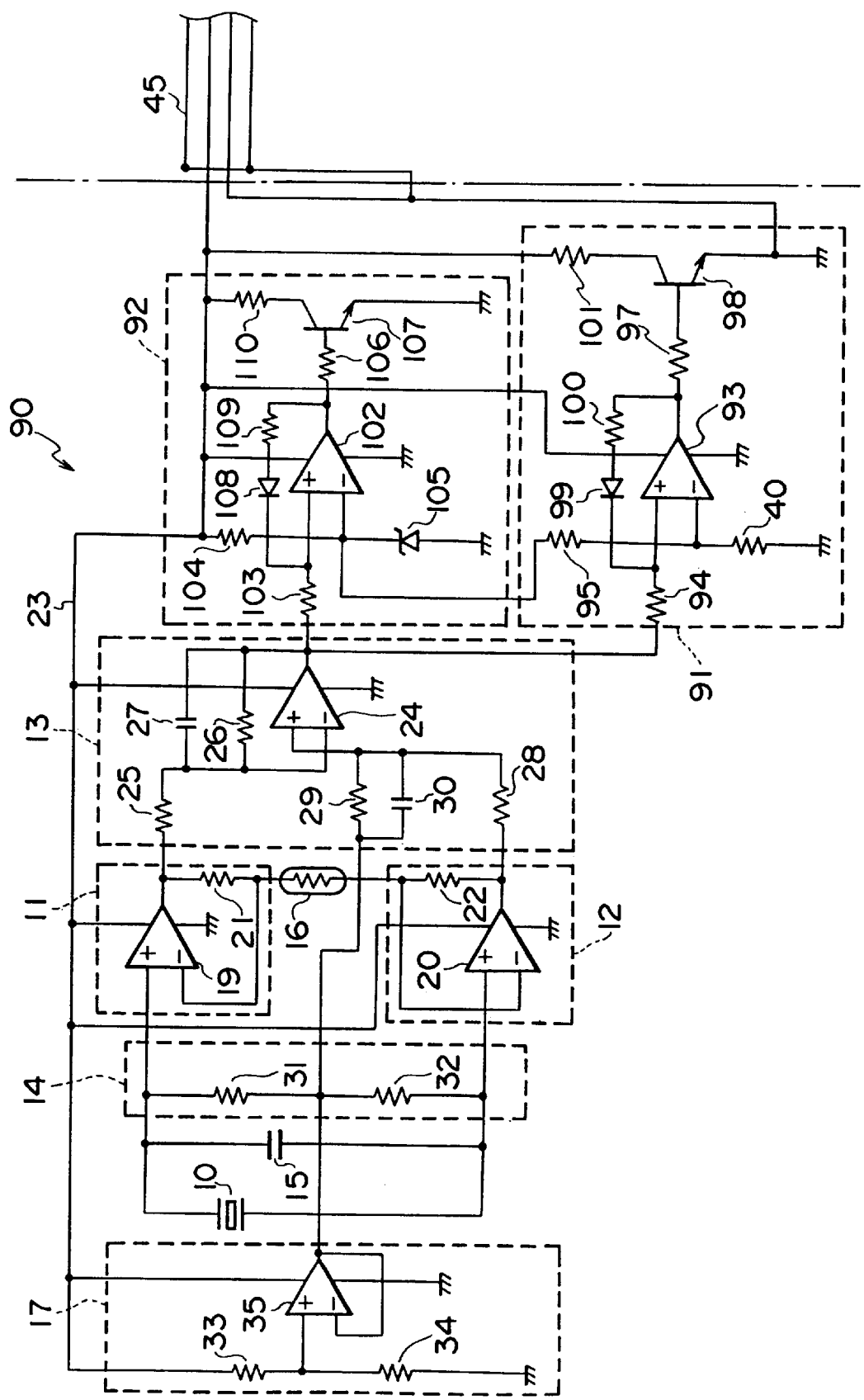
FIG. 9 is a circuit diagram showing another example of the front acceleration sensor in FIG. 1.

FIG. 9 is a circuit diagram showing another example of the front acceleration sensor in FIG. 1. In FIG. 9, components that are given the same reference numerals as those of FIG. 2 indicate the same.

In FIG. 9, a reference numeral 90 is a front acceleration sensor. The front acceleration sensor 90 is applied to the composition of FIG. 1 instead of the front acceleration sensor 5 of FIG. 2. The front acceleration sensor 5 has first and second comparison circuits 91 and 92 instead of the comparison circuit 18 of FIG. 2.

The first comparison circuit 91 has a first comparator 93 composed of a bipolar transistor type operational amplifier. An operating power source of the first comparator 93 is supplied from the sensor power supply line 23. A positive input terminal of the first comparator 93 inputs the output of the differential amplifier circuit 13 through a resistor 94. A negative input terminal of the first comparator 93 inputs a first reference voltage Eth1 which is given by reference resistors 95 and 96 connected in series. The series connection of the reference resistors 95 and 96 is connected in parallel to a Zener diode 105 which gives a second reference voltage Eth2 in the second comparison circuit 92, and gives the first reference voltage Eth1 by dividing the second reference voltage Eth2. The first reference voltage Eth1 is a threshold value for detecting a first predetermined collision acceleration. An output terminal of the first comparator 93 is connected to a base of a first switching transistor 98 through a resistor 97, and is also connected to its positive input terminal through a series connection of a diode 99 and a resistor 100. The diode 99 is inserted so that the direction from the output terminal toward the positive input terminal becomes the forward direction. The diode 99 and the resistors 94 and 100 constitute a chattering prevention circuit of the first comparator 93. That is, when the output of the differential amplifier circuit 13 exceeds the first reference voltage Eth1, a High level output of the first comparator 93 is provided as feedback to the positive input terminal. By this, chattering of the first comparator 93 is prevented. An emitter of the first switching transistor 98 is grounded, and its collector is connected to the sensor power supply line 23 through a resistor 101. In the first comparison circuit 91 which is composed as described above, when the output of the differential amplifier circuit 13 namely an integrated value of acceleration is smaller than the first reference voltage Eth1, the output of the first comparator 93 is a Low level, and the first switching transistor 98 is in an Off state. When the output of the differential amplifier circuit 13 is larger than the first reference voltage Eth1, the first comparator 93 outputs a High level signal indicating a detection of the first predetermined collision acceleration, and the first switching transistor 98 is made On. By this, a current flows through the resistor 101 and the transistor 98 from the sensor power supply line 23 to the ground, and thereby a current value in the sensor power supply line 23 becomes higher. That is, a first detection signal representative of the detection of the first predetermined collision acceleration is output as a current variation in the sensor power supply line 23.

The second comparison circuit 92 has a second comparator 102 composed of a bipolar transistor type operational amplifier. An operating power source of the second comparator 102 is supplied from the sensor power supply line 23. A positive input terminal of the second comparator 102 inputs the output of the differential amplifier circuit 13 through a resistor 103. A negative input terminal of the second comparator 102 inputs the second reference voltage Eth2 which is given by a series connection of a resistor 104 and the Zener diode 105 inserted between the sensor power supply line 23 and the ground. The second reference voltage Eth2 is a threshold value for detecting a second predetermined collision acceleration larger than the first predetermined collision acceleration, and has a value higher than the first reference voltage Eth1. An output terminal of the second comparator 102 is connected to a base of a second switching transistor 107 through a resistor 106, and is also connected to its positive input terminal through a series connection of a diode 108 and a resistor 109. The diode 108 is inserted so that the direction from the output terminal toward the positive input terminal becomes the forward direction. The diode 108 and the resistors 103 and 109 constitute a chattering prevention circuit of the second comparator 102. That is, when the output of the differential amplifier circuit 13 exceeds the second reference voltage Eth2, a High level output of the second comparator 102 is provided as feedback to the positive input terminal. By this, chattering of the second comparator 102 is prevented. An emitter of the second switching transistor 107 is grounded, and its collector is connected to the sensor power supply line 23 through a resistor 110. In the second comparison circuit 92 which is composed as described above, when the output of the differential amplifier circuit 13 namely an integrated value of acceleration is smaller than the second reference voltage Eth2, the output of the second comparator 102 is a Low level, and the second switching transistor 107 is in an Off state. When the output of the differential amplifier circuit 13 is larger than the second reference voltage Eth2, the second comparator 102 outputs a High level signal indicating a detection of the second predetermined collision acceleration larger than the first predetermined collision acceleration, and the second switching transistor 107 is made On. By this, a current flows through the resistor 110 and the transistor 107 from the sensor power supply line 23 to the ground, and thereby a current value in the sensor power supply line 23 further rises. That is, a second detection signal representative of the detection of the second predetermined collision acceleration is output as a current variation in the sensor power supply line 23. Composition and operation of other portions is as described in FIG. 2.

Figure 10:
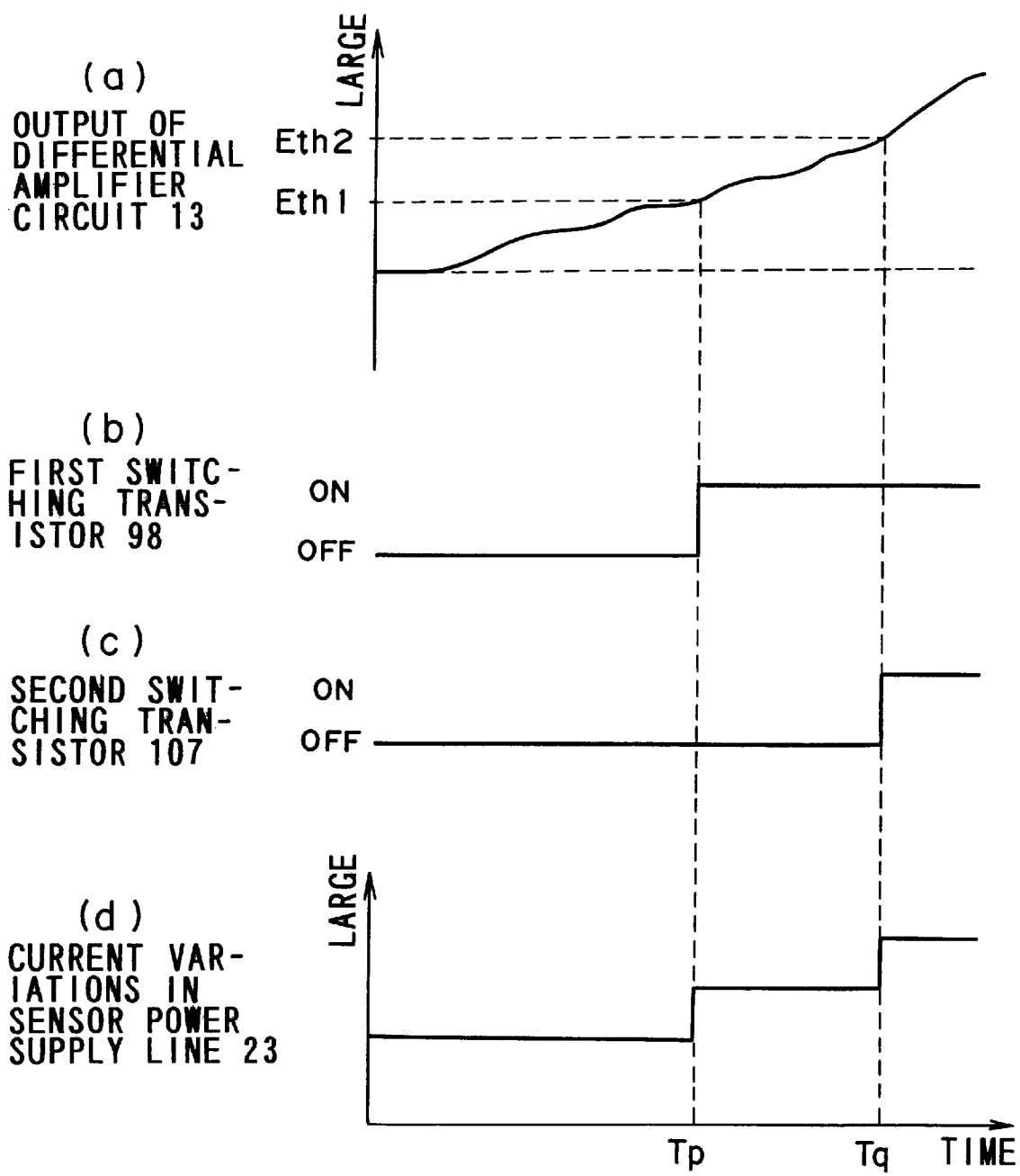
FIG. 10 is an explanatory drawing for explaining an operation of the front acceleration sensor of FIG. 9.

FIG. 10 is an explanatory drawing for explaining an operation of the front acceleration sensor 90 of FIG. 9. In FIG. 10, a reference letter (a) shows the output of the differential amplifier circuit 13 namely an integrated value of acceleration, a reference letter (b) shows On/Off of the first switching transistor 98 of the first comparison circuit 91, a reference letter (c) shows On/Off of the second switching transistor 107 of the second comparison circuit 92, and a reference letter (d) shows current variations in the sensor power supply line 23.

When the piezo-electric element 10 does not detect any acceleration, the differential amplifier circuit 13 gives a prescribed voltage output lower than the first reference voltage Eth1 based on the reference potential of the reference voltage circuit 17. Therefore, the first and second comparators 93 and 102 give the Low level outputs, the first and second switching transistors 98 and 107 are in the Off states, and a current flowing through the sensor power supply line 23 and the unit power supply line 54 is a certain value and does not vary. In the receiving circuit 3 of the control unit 1, the pair of transistors 50 and 51 give a current to the detection resistor 53 based on base-emitter voltages according to the certain current flowing through the unit power supply line 54. Thus, a prescribed voltage signal indicating that the first and second detection signals are not provided from the front acceleration sensor 90 is given by way of the detection resistor 53 to the microcomputer 2. The microcomputer 2 inputs the prescribed voltage signal by way of A/D conversion.

On the other hand, when the piezo-electric element 10 detects an acceleration, the differential amplifier circuit 13 outputs a voltage representative of an integrated value of the acceleration as shown in FIG. 10(a). When the output of the differential amplifier circuit 13 exceeds the first reference voltage Eth1, the first comparator 93 outputs the High level signal, and the first switching transistor 98 is made On as shown in FIG. 10(b). Hereby, a current flows through the resistor 101 and the transistor 98 from the sensor power supply line 23 to the ground, a current value in the sensor power supply line 23 rises as shown in FIG. 10(d), and thereby the first detection signal is provided to the receiving circuit 3 of the control unit 1. When the output of the differential amplifier circuit 13 further rises to exceed the second reference voltage Eth2, the second comparator 102 outputs the High level signal, and the second switching transistor 107 is made On. By this, a current flows through the resistor 110 and the transistor 107 from the sensor power supply line 23 to the ground, a current value in the sensor power supply line 23 further rises as shown in FIG. 10(d), and thereby the second detection signal is provided to the receiving circuit 3. In the receiving circuit 3, a base-emitter voltage of one transistor 50 of the current mirror circuit 52 varies according to the current variations in the unit power supply line 54 namely the first and second detection signals of the front acceleration sensor 90. By this, the other transistor 51 gives the detection resistor 53 a collector current so that a base-emitter voltage of the other transistor 51 is the same potential as the base-emitter voltage of one transistor 50. Hereby, the first and second detection signals from the front acceleration sensor 90 is given as voltage signals by the detection resistor 53, and the microcomputer 2 inputs the voltage signals by way of A/D conversion.

In FIG. 10, a first time point Tp is a time point at which the first detection signal is output, and a second time point Tq is a time point at which the second detection signal is output. In a collision with a large impact such as a high-speed collision, since the output of the differential amplifier circuit 13 rises rapidly, an interval between the first time point Tp and the second time point Tq becomes small. In a collision in which an impact is small, the interval between the first time point Tp and the second time point Tq becomes large.

Figure 11:
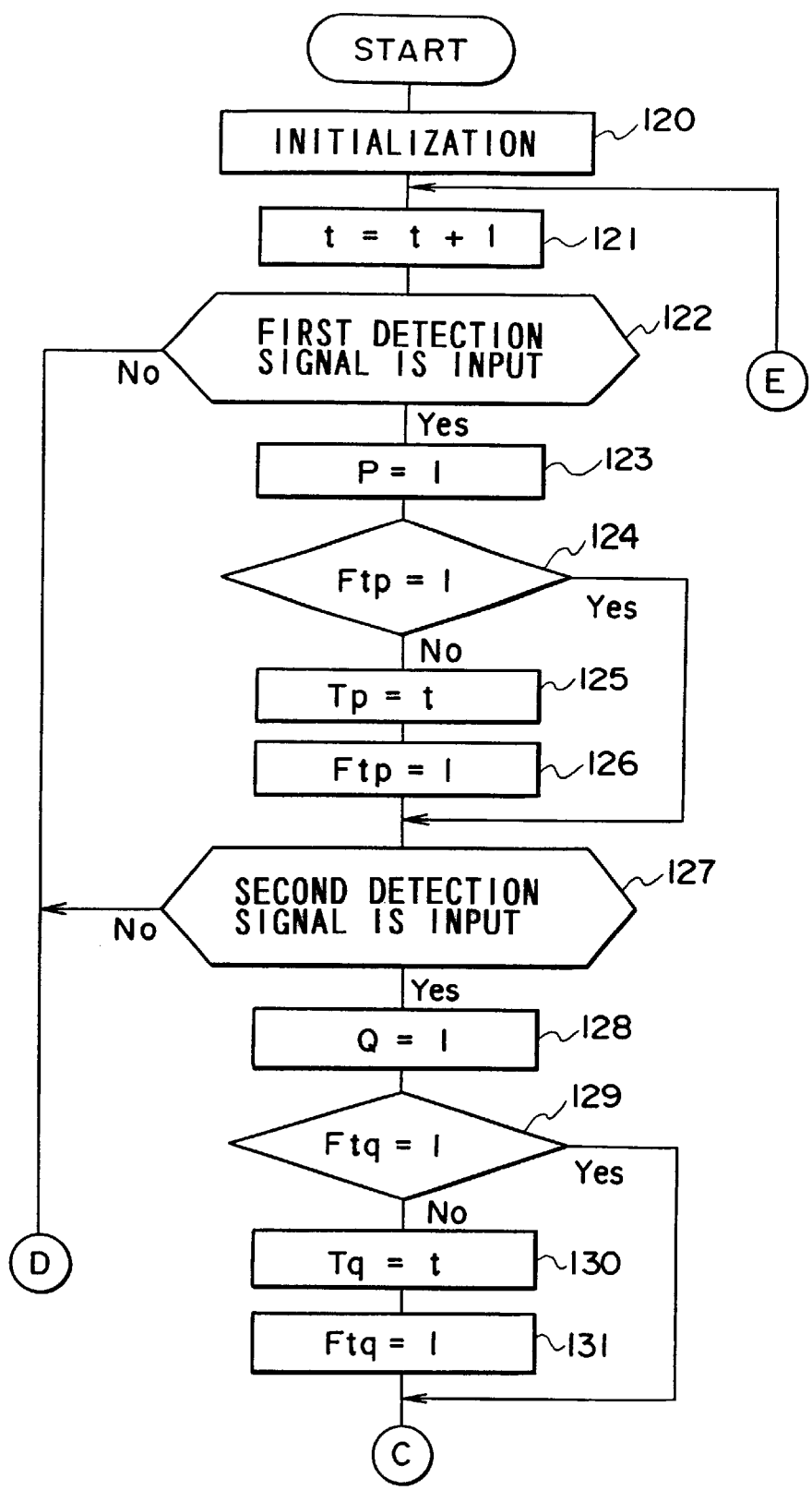
FIG. 11 and FIG. 12 are flow diagrams of the microcomputer of FIG. 1 showing a fourth embodiment of the present invention.
Figure 12:
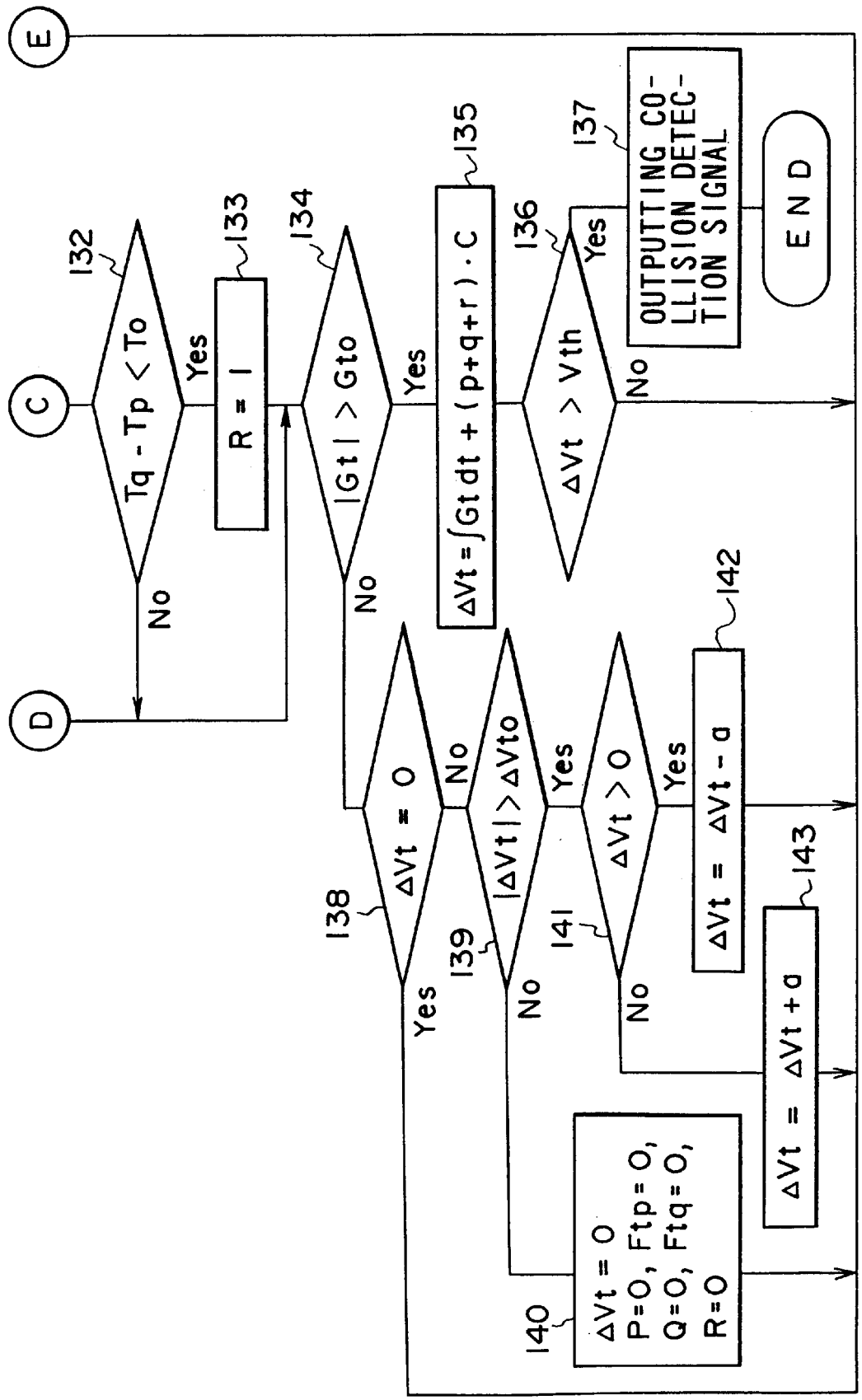

FIG. 11 and FIG. 12 are flow diagrams of the microcomputer 2 of FIG. 1 showing a fourth embodiment of the present invention. FIG. 11 and FIG. 12 are the flow diagrams in the case in which the front acceleration sensor 90 of FIG. 9 is used, and are applied to the microcomputer 2 in place of the flow diagrams of FIG. 5 and FIG. 6. Terminals C, D and E of FIG. 12 are connected to terminals having the same signs C, D and E of FIG. 11.

The microcomputer 2 of the control unit 1, when the control processing is started, enters a step 121 after an initialization of a step 120. In the step 121, a soft-timer t is increased +1. Thereafter, the microcomputer 2 enters a step 122.

In the step 122, the microcomputer 2 decides whether the first detection signal representative of detection of the first predetermined collision acceleration is input from the front acceleration sensor 90. If the first detection signal is input, the microcomputer 2 enters a step 123 and sets a first increment flag P to "1". The first increment flag P is a flag for setting a factor p of an addition value $\{(p+q+r) \times C\}$ in a step 135 of FIG. 12 to "1" or "0". The factor p is "0" when the flag P is "0", and the factor p is set to "1" when the flag P is set to "1". The first increment flag P is reset to "0" in the initialization of the step 120 and a step 140 of FIG. 12. Thereafter, the microcomputer 2 enters a step 124 and decides whether a first decision flag Ftp is "1". The first decision flag Ftp is a flag for deciding whether the first detection signal from the front acceleration sensor 90 is input for the first time after starting the control processing. The flag Ftp is reset to "0" in the initialization of the step 120 and the step 140 of FIG. 12, and is set to "1" in a step 126 described below. Therefore, when the first detection signal from the front acceleration sensor 90 is input for the first time, the status of the flag Ftp in the step 124 is "0". In this case, the microcomputer 2 recognizes the first time point Tp from the soft-timer t in a step 125, sets the flag Ftp to "1" in a following step 126, and enters a step 127. As described above, the first time point Tp indicates a time point at which the first detection signal has been given. If the flag Ftp has been set to "1", the microcomputer 2 directly enters from the step 124 to the step 127 without entering the steps 125 and 126. On the other hand, in the step 122, if the first detection signal from the front acceleration sensor 90 is not input, the microcomputer 2 directly enters a step 134 of FIG. 12.

In the step 127, the microcomputer 2 decides whether the second detection signal representative of detection of the second predetermined collision acceleration larger than the first predetermined collision acceleration is input from the front acceleration sensor 90. If the second detection signal is input, the microcomputer 2 enters a step 128 and sets a second increment flag Q to "1". The second increment flag Q is a flag for setting a factor q of the addition value $\{(p+q+r) \times C\}$ in the step 135 of FIG. 12 to "1" or "0". The factor q is "0" when the flag Q is "0", and the factor q is set to "1" when the flag Q is set to "1". The second increment flag Q is reset to "0" in the initialization of the step 120 and the step 140 of FIG. 12. Thereafter, the microcomputer 2 enters a step 129 and decides whether a second decision flag Ftq is "1". The second decision flag Ftq is a flag for deciding whether the second detection signal from the front acceleration sensor 90 is input for the first time after starting the control processing. The flag Ftq is reset to "10" in the initialization of the step 120 and the step 140 of FIG. 12, and is set to "1" in a step 131 described below. Therefore, when the second detection signal is input from the front acceleration sensor 90 for the first time, the status of the flag Ftq in the step 129 is "0". In this case, the microcomputer 2 recognizes the second time point Tq from the soft-timer t in a step 130, sets the flag Ftq to "1" in a following step 131, and enters a step 132 of FIG. 12. As described above, the second time point Tq indicates a time point at which the second detection signal has been given. If the flag Ftq is "1" in the step 129, the microcomputer 2 directly enters from the step 129 to the step 132 of FIG. 12 without entering the steps 130 and 131. On the other hand, in the step 127, if the second detection signal is not input from the front acceleration sensor 90, the microcomputer 2 directly enters the step 134 of FIG. 12.

In the step 132 of FIG. 12, the microcomputer 12 decides whether a time difference Tq-Tp between the second time point Tq and the first time point Tp is smaller than a predetermined value To. If the time difference Tq-Tp is smaller than the predetermined value To, the microcomputer 2 recognizes an occurrence of a collision with a large impact, such as a high-speed collision, in which the occupant protection device 7 is required to drive quickly, and enters a step 133. In the step 133, a third increment flag R is set to "1". The third increment flag R is a flag for setting a factor r of the addition value $\{(p+q+r) \times C\}$ in the step 135 to "1" or "0". The factor r is "0" when the flag R is "0", and the factor r is set to "1" when the flag R is set to "1". The third increment flag R is reset to "0" in the initialization of the step 120 and the step 140 described later. Thereafter, the microcomputer 2 enters the step 134. On the other hand, in the step 132, If the time difference Tq-Tp is not smaller than the predetermined value To, the microcomputer 2 directly enters from the step 132 to the step 134.

In the step 134, the microcomputer 2 inputs the acceleration signal Gt of the room acceleration sensor 6, and decides whether an absolute value of the acceleration signal Gt is larger than the reference value Gto. The reference value Gto is as described in the first embodiment. When the absolute value of the acceleration signal Gt is larger than the reference value Gto, the microcomputer 2 enters a step 135 and computes an integrated value $\Delta$Vt by adding the addition value $\{(p+q+r) \times C\}$ to an integrated value of the acceleration signal Gt. In the addition value $\{(p+q+r) \times C\}$, C is a numerical constant. Since the front acceleration sensor 90 outputs the second detection signal after the first detection signal, the second increment flag Q is not set unless the first increment flag P is set. Also, as apparent from the flow diagrams of FIG. 11 and FIG. 12, only when both the first and second increment flags P and Q are set and furthermore the time difference Tq-Tp between the first and second time points Tp and Tq is smaller than the predetermined value To, the third increment flag R is set to "1". Therefore, the addition value $\{(p+q+r) \times C\}$ is "0" if the flag P is not set. If the flag P is set, the addition value $\{(p+q+r) \times C\}$ is "C". If the flags P and Q are set, the addition value $\{(p+q+r) \times C\}$ is "2C". If the flags P, Q and R are set, the addition value $\{(p+q+r) \times C\}$ is "3C". Accordingly, the integrated value $\Delta$Vt is increased to {the integrated value of the acceleration signal Gt+C} when the flag P is set, is further increased to {the integrated value of the acceleration signal Gt+2C} when the flags P and Q are set, and is furthermore increased to {the integrated value of the acceleration signal Gt+3C} when the flags P, Q and R are set. The microcomputer 2 enters a step 136 after the step 135, and decides whether the integrated value $\Delta$Vt is larger than a predetermined threshold value Vth. If the integrated value $\Delta$Vt is not larger than the threshold value Vth, the microcomputer 2 returns to the step 121 of FIG. 11. If the integrated value ΔVt is larger than the threshold value Vth, the microcomputer 2 enters a step 137, outputs the collision detection signal to the drive circuit 4, and finishes the control processing. The drive circuit 4, when the collision detection signal is provided from the microcomputer 2, outputs the drive signal to the occupant protection device 7, and thereby the occupant protection device 7 such as an airbag is driven.

On the other hand, in the step 134, when the absolute value of the acceleration signal Gt of the room acceleration sensor 6 is not larger than the reference value Gto, the microcomputer 2 enters a reset processing of steps 138–143, and returns to the step 121 of FIG. 11 after the reset processing. In the reset processing of the steps 138–143, the processing like the reset processing of the first embodiment is performed. That is, in the step 138, whether the integrated value ΔVt is "0" is decided. The microcomputer 2 directly returns from the step 138 to the step 121 of FIG. 11 when the integrated value ΔVt is "0", and enters the following step 139 when the integrated value ΔVt is not "0". In the step 139, whether the absolute value of the integrated value ΔVt is larger than the reset reference value ΔVto is decided. The reset reference value ΔVto is as described in the first embodiment. When the absolute value of the integrated value ΔVt is smaller than the reference value ΔVto, the microcomputer 2 enters the step 140, resets the integrated value ΔVt to "0", and also resets the flags P, Ftp, Q, Ftq and R to "0". Thereafter, the microcomputer 2 returns to the step 121 of FIG. 11. When the absolute value of the integrated value ΔVt is larger than the reference value ΔVto, the microcomputer 2 enters from the 139 to the step 141 and decides whether the integrated value ΔVt is larger than "0". The subtraction value "a" is subtracted from the integrated value ΔVt in the step 142 when the integrated value ΔVt is larger than "0", and the subtraction value "a" is added to the integrated value ΔVt in the step 143 when the integrated value ΔVt is smaller than "0". Thereafter, the microcomputer 2 returns to the step 121 of FIG. 11.

In the fourth embodiment, for example, in a case in which a collision comes to an end under a state that the integrated value ΔVt of the room acceleration sensor 6 does not exceed the threshold value Vth though the first detection signal from the front acceleration sensor 90 has been given, the first increment flag P and the first decision flag Ftp are reset in the steps 120 and 140. Because of this, the flags P and Ftp do not stay at the state of "1".

According to the fourth embodiment described above, the front acceleration sensor 90 outputs the first detection signal representative of the detection of the first predetermined collision acceleration and the second detection signal representative of the detection of the second predetermined collision acceleration lager than the first predetermined collision acceleration. When the front acceleration sensor 90 outputs the first detection signal, the integrated value ΔVt of the room acceleration sensor 6 is increased to {the integrated value of the acceleration signal Gy+C}. When the front acceleration sensor 90 outputs the second detection signal, the integrated value ΔVt is further increased to {the integrated value of the acceleration signal Gy+2C}. The front acceleration sensor 90 is provided in the front part of the vehicle. Hence, even when a collision acceleration transmitted to the room acceleration sensor 6 is weakened, the front acceleration sensor 90 can detect the collision acceleration early and give the first and/or second detection signal to the control unit 1. By this, since the integrated value ΔVt is increased immediately, the control unit 1 can exactly drive the occupant protection device 7 without causing a delay in collision decision. Moreover, when the time difference Tq-Tp between the first and second time points Tp and Tq is smaller than the predetermined value To, the integrated value ΔVt is furthermore increased to {the integrated value of the acceleration signal Gy+3C}. Because of this, even in case of a collision such as a high-speed collision, it is possible to exactly drive the occupant protection device 7 without causing a delay in the collision decision.

Although one front acceleration sensor is used in the fourth embodiment, this is not intended to limit the scope of the invention. The present invention can be also applied to a case in which a plurality of front acceleration sensors are used, as shown in FIG. 13 mentioned below, for example.

Although in the fourth embodiment the factors p, q and r of the addition value {(p+q+r)×C} are set to "0" or "1", the factors p, q and r can be set to optional values according to the need.

Figure 13:
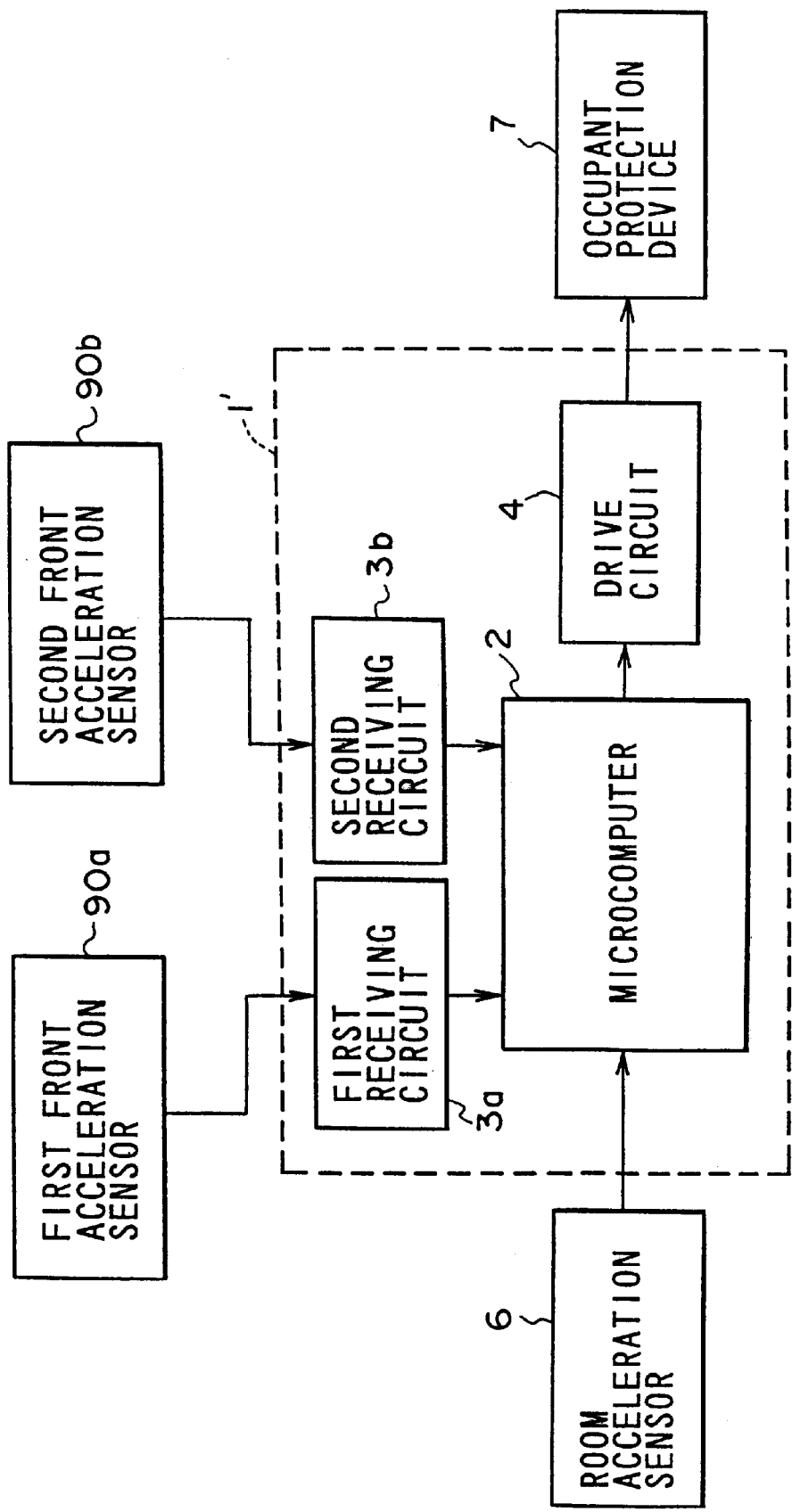
FIG. 13 is a block diagram showing a fifth embodiment of the present invention.

FIG. 13 is a block diagram showing a fifth embodiment of the present invention. In the fifth embodiment, first and second front acceleration sensors 90a and 90b are provided. The front acceleration sensors 90a and 90b each have the circuit composition shown in FIG. 9.

The front acceleration sensors 90a and 90b are provided likewise the front acceleration sensors 5a and 5b of FIG. 8. Each of the front acceleration sensors 5a and 5b outputs the first detection signal when detecting the first predetermined collision acceleration, and outputs the second detection signal when detecting the second predetermined collision acceleration lager than the first predetermined collision acceleration. The first and second detection signals of the first front acceleration sensor 90a are given to the microcomputer 2 by way of the first receiving circuit 3a of the control unit 1'. The first and second detection signals of the second front acceleration sensor 90b are given to the microcomputer 2 by way of the second receiving circuit 3b of the control unit 1'. The first and second receiving circuits 3a and 3b are as described in FIG. 3. The microcomputer 2, in the step 122 of FIG. 11, decides whether the first detection signal is input from at least one of the first and second front acceleration sensors 90a and 90b. Also, the microcomputer 2, in the step 127 of FIG. 11, decides whether the second detection signal is input from at least one of the first and second front acceleration sensors 90a and 90b. Composition and operation of other portions is as described in relation to the fourth embodiment.

Figure 14:
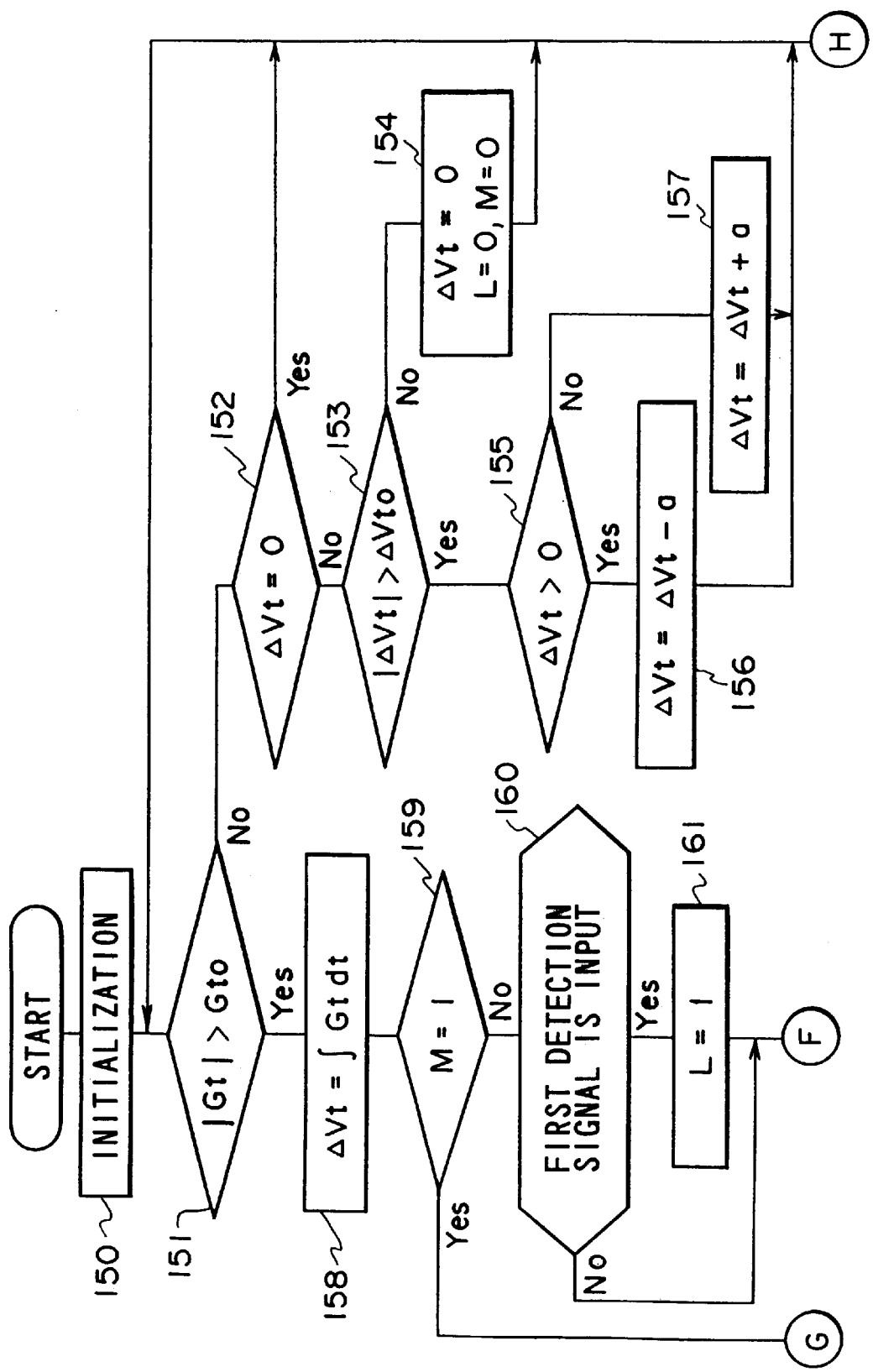
FIG. 14 and FIG. 15 are flow diagrams of the microcomputer of FIG. 1 showing a sixth embodiment of the present invention.
Figure 15:
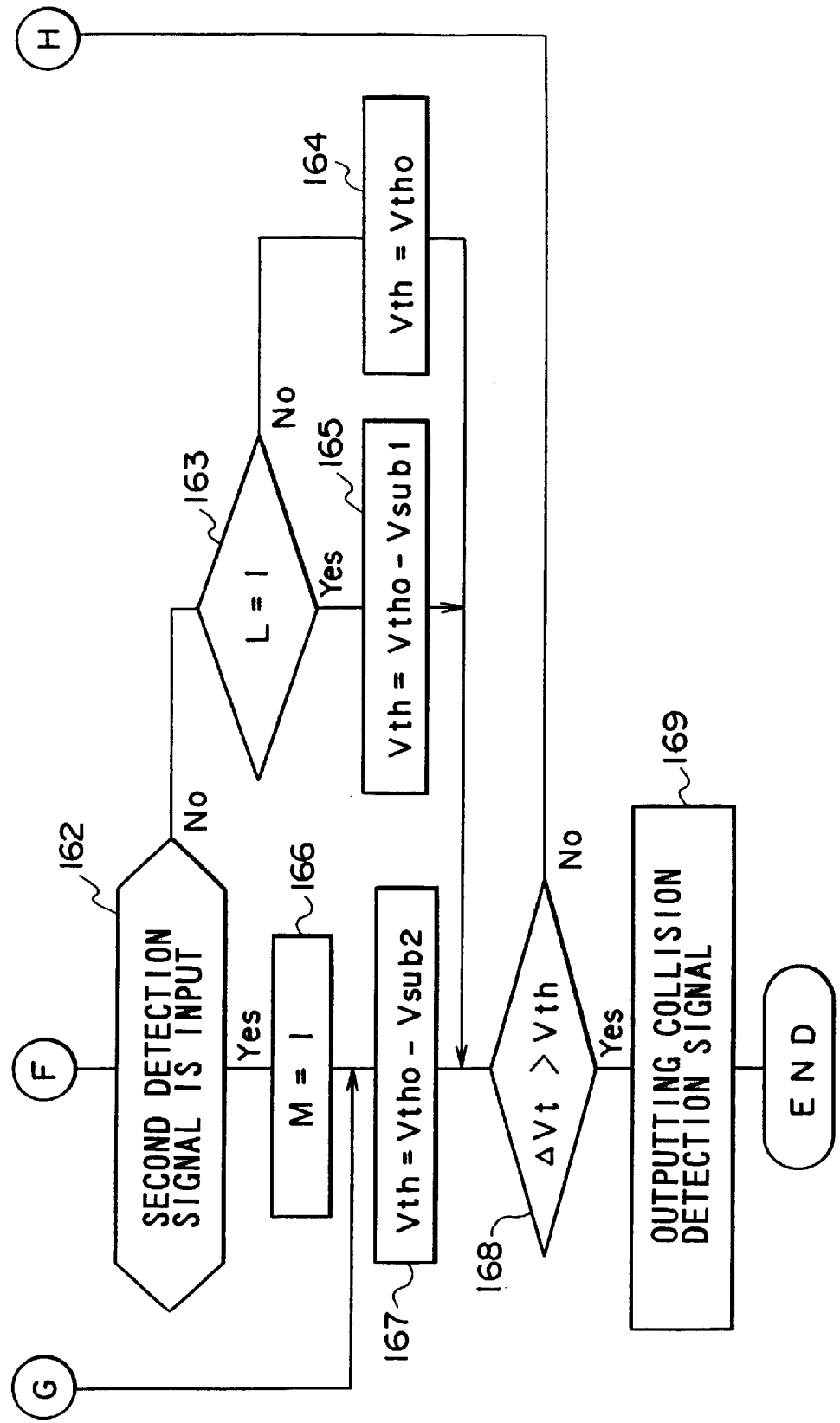

FIG. 14 and FIG. 15 are flow diagrams of the microcomputer 2 of FIG. 1 showing a sixth embodiment of the present invention. FIG. 14 and FIG. 15 are the flow diagrams in the case in which the front acceleration sensor 90 of FIG. 9 is used, and are applied to the microcomputer 2 in place of the flow diagrams of FIG. 5 and FIG. 6. Terminals F, G and H of FIG. 15 are connected to terminals having the same signs F, G and H of FIG. 14.

The microcomputer 2 of the control unit 1, when the control processing is started, enters a step 151 after an initialization of a step 150. In the step 151, the microcomputer 2 inputs the acceleration signal Gt of the room acceleration sensor 6, and decides whether an absolute value of the acceleration signal Gt is larger than the reference value Gto. The reference value Gto is as described in the first embodiment of FIG. 5 and FIG. 6. In the step 151, when the absolute value of the acceleration signal Gt is not larger than the reference value Gto, the microcomputer 2 enters a reset processing of steps 152–157, and returns to the step 151 after the reset processing. In the reset processing of the steps 152–157, the processing like the aforementioned reset processing of the step 138–143 of FIG. 12 except for the step 154 is performed. In the step 154, first and second decrement flags L and M are reset to "0" together with an integrated value ΔVt of the acceleration signal Gt.

On the other hand, in the step 151, when the absolute value of the acceleration signal Gt is larger than the reference value Gto, the microcomputer 2 computes the integrated value ΔVt of the acceleration signal Gt in a step 158, and then enters a step 159. In the step 159, whether the second decrement flag M is "1" is decided. The second decrement flag M is described later. It is here assumed that the second decrement flag M is "0". The microcomputer 2 enters from the step 159 to a step 160 and decides whether the first detection signal is input from the front acceleration sensor 90. As mentioned above, the first detection signal is output from the front acceleration sensor 90 when detecting the first predetermined collision acceleration. If the first detection signal is input, the microcomputer 2 sets the first decrement flag L to "1" in a step 161, and enters a step 162 of FIG. 15. The first decrement flag L is a flag for indicating whether to decrease a threshold value Vth described later. The flag L is reset to "0" in the initialization of the step 150 and the step 154 of the reset processing. If the first detection signal is not input from the front acceleration sensor 90, the microcomputer 2 directly enters the step 162 of FIG. 15.

In the step 162 of FIG. 15, whether the second detection signal is input from the front acceleration sensor 90 is decided. As mentioned above, the second detection signal is output from the front acceleration sensor 90 when detecting the second predetermined collision acceleration larger than the first predetermined collision acceleration. If the second detection signal is not output, the microcomputer 2 enters a step 163 and decides whether the flag L is "1". When the flag L is not "1", namely if the first and second detection signals are not input, the microcomputer 2 enters from 163 to a step 164, sets a basic threshold value Vtho as the threshold value Vth, and then enters a step 168. When the flag L is "1" in the step 163, namely if the first detection signal only is input, the microcomputer 2 enters from the step 163 to a step 165, computes a value Vtho-Vsub1 by subtracting a first decrement value Vsub1 from the basic threshold value Vtho, and sets the value Vtho-Vsub1 as the threshold value Vth. Thereafter, the microcomputer 2 enters the step 168.

On the other hand, if the second detection signal is input from the front acceleration sensor 90, the microcomputer 2 enters from the step 162 to a step 166 and sets the second decrement flag M to "1". The second decrement flag M is a flag for indicating whether to further decrease the threshold value Vth. The flag M is reset to "0" in the initialization of the step 150 and the step 154 of the reset processing. Thereafter, the microcomputer 2 enters a step 167. In the step 167, the microcomputer 2 computes a value Vtho-Vsub2 by subtracting a second decrement value Vsub2 larger than the first decrement value Vsub1 from the basic threshold value Vtho, and sets the value Vtho-Vsub2 as the threshold value Vth. Thereafter, the microcomputer 2 enters the step 168. In the step 159 of FIG. 14, when the second decrement flag M is "1", the microcomputer 2 directly enters from the step 159 to the step 167 and sets the value Vtho-Vsub2 as the threshold value Vth.

In the step 168, whether the integrated value ΔVt of the acceleration signal Gt of the room acceleration sensor 6 is larger than the threshold value Vth is decided. When the integrated value ΔVt is not larger than the threshold value Vth, the microcomputer 2 returns to the step 151 of FIG. 14, and the aforementioned control processing is repeated. When the integrated value ΔVt is larger than the threshold value Vth, the microcomputer 2 enters from the step 168 to a step 169, outputs the collision detection signal to the drive circuit 4, and finishes the control processing.

According to the sixth embodiment described above, the threshold value Vth is reduced by the first decrement value Vsub1 if the first detection signal is input from the front acceleration sensor 90, and the threshold value Vth is further reduced by the second decrement value Vsub2 larger than the first decrement value Vsub1 if the second detection signal is input from the front acceleration sensor 90. Since the front acceleration sensor 90 is provided in the front part of the vehicle, even when a collision acceleration transmitted to the room acceleration sensor 6 is weakened, the front acceleration sensor 90 can detect the collision acceleration early and give the first and/or second detection signal to the control unit 1. By this, since the threshold value Vth is decreased immediately, the control unit 1 can exactly drive the occupant protection device 7 without causing a delay in collision decision.

Although one front acceleration sensor is used in the sixth embodiment, this is not intended to limit the scope of the invention. The present invention can be also applied to a case in which a plurality of front acceleration sensors are used, as shown in FIG. 13, for example. In a case in which the first and second front acceleration sensors 90a and 90b are provided as shown in FIG. 13, whether the first detection signal is input from at least one of the first and second front acceleration sensor 90a and 90b is decided in the step 160 of FIG. 14, and whether the second detection signal is input from at least one of the first and second front acceleration sensors 90a and 90b is decided in the step 162 of FIG. 15.

Figure 16:
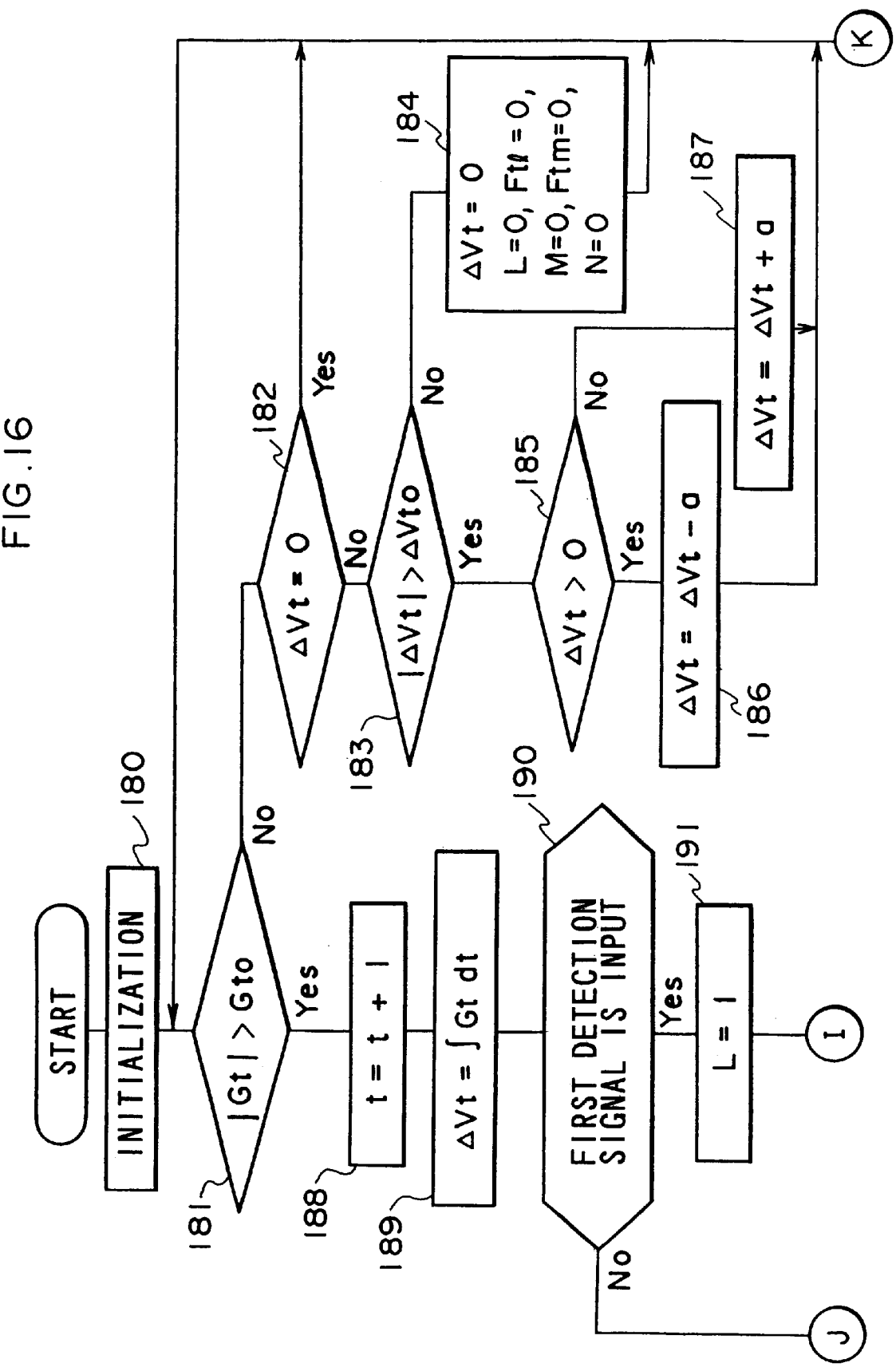
FIG. 16, FIG. 17 and FIG. 18 are flow diagrams of the microcomputer of FIG. 1 showing a seventh embodiment of the present invention.
Figure 17:
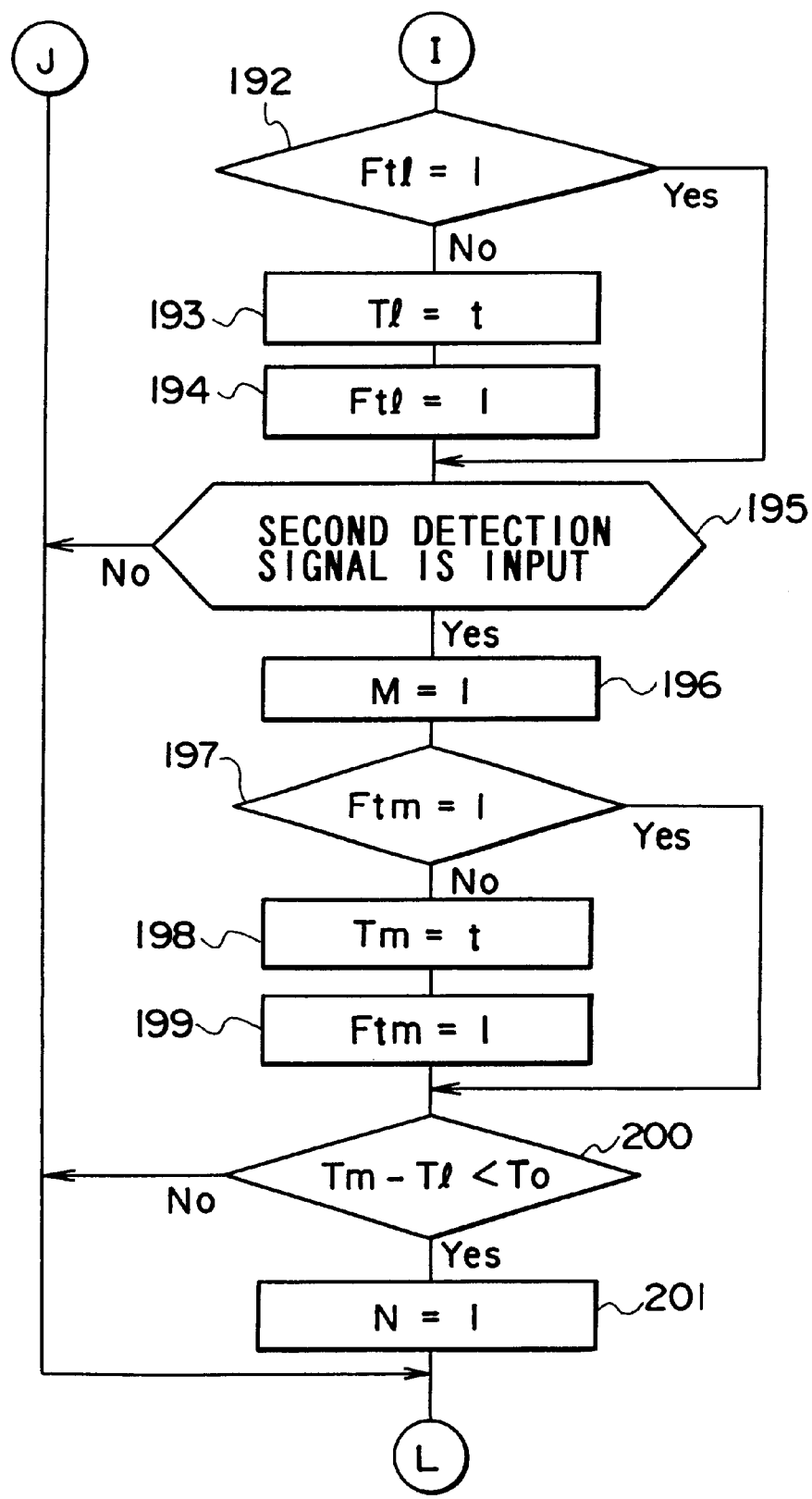
Figure 18:
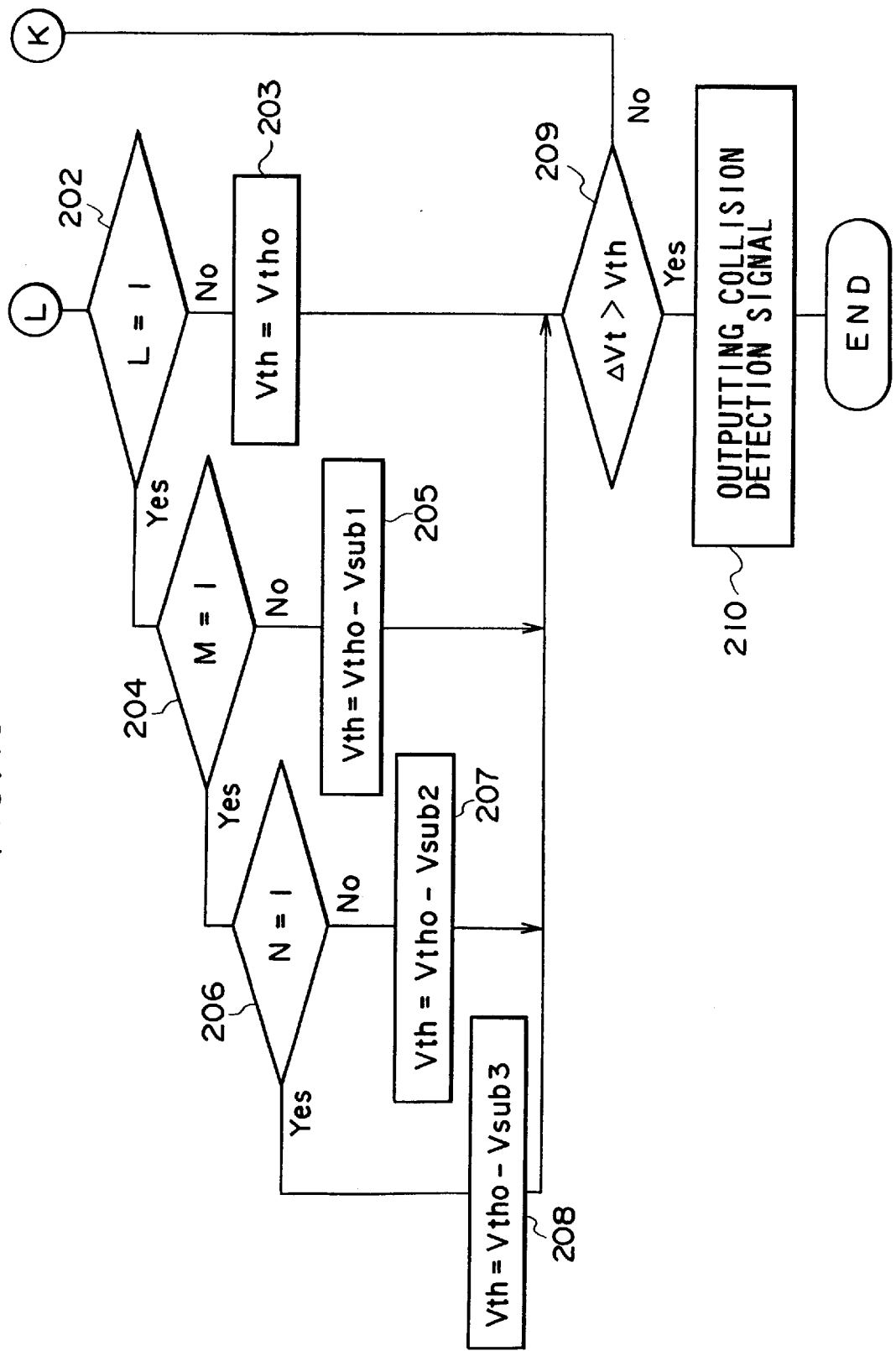

FIG. 16, FIG. 17 and FIG. 18 are flow diagrams of the microcomputer 2 of FIG. 1 showing a seventh embodiment of the present invention. FIG. 16, FIG. 17 and FIG. 18 are the flow diagrams in the case in which the front acceleration sensor 90 of FIG. 9 is used, and are applied to the microcomputer 2 in place of the flow diagrams of FIG. 5 and FIG. 6. Terminals I and J of FIG. 17 are connected to terminals having the same signs I and J of FIG. 16, and terminals L and K of FIG. 18 are connected to terminals having the same signs L and K of FIG. 16 and FIG. 17.

The microcomputer 2 of the control unit 1, when the control processing is started, enters a step 181 after an initialization of a step 180. In the step 181, the microcomputer 2 inputs the acceleration signal Gt of the room acceleration sensor 6, and decides whether an absolute value of the acceleration signal Gt is larger than the reference value Gto. The reference value Gto is as described in the first embodiment of FIG. 5 and FIG. 6. In the step 181, when the absolute value of the acceleration signal Gt is not larger than the reference value Gto, the a microcomputer 2 enters a reset processing of steps 182–187, and returns to the step 181 after the reset processing. In the reset processing of the steps 182–187, the processing like the aforementioned reset processing of the step 138–143 of FIG. 12 except for the step 184 is performed. In the step 184, flags L, M, N, Ftl and Ftm are reset to "0" together with an integrated value ΔVt of the acceleration signal Gt.

On the other hand, in the step 181, when the absolute value of the acceleration signal Gt of the room acceleration sensor 6 is larger than the reference value Gto, a soft-timer t is increased +1 in a step 188. Thereafter, the microcomputer 2 computes an integrated value ΔVt of the acceleration signal Gt in a following step 189, and then enters a step 190.

In the step 190, the microcomputer 2 decides whether the first detection signal is input from the front acceleration sensor 90. As mentioned above, the first detection signal is output from the front acceleration sensor 90 when detecting the first predetermined collision acceleration. If the first detection signal is input, the microcomputer 2 enters from the step 190 to a step 191 and sets a first decrement flag L to "1". The first decrement flag L is a flag for indicating whether to decrease a threshold value Vth described later. The flag L is reset to "0" in the initialization of the step 180 and the step 184 of the reset processing. Thereafter, the microcomputer 2 enters a step 192 of FIG. 17 and decides whether a first decision flag Ftl is "1". The first decision flag Ftl is a flag for deciding whether the first detection signal from the front acceleration sensor 90 is input for the first time after starting the control processing. The flag Ftl is reset to "0" in the initialization of the step 180 and the step 184 of the reset processing, and is set to "1" in a step 194 described below. Therefore, when the first detection signal from the front acceleration sensor 90 is input for the first time, the status of the flag Ftl in the step 192 is "0". In this case, the microcomputer 2 recognizes the first time point Tl from the soft-timer t in a step 193, sets the flag Ftl to "1" in a following step 194, and enters a step 195. The first time point Tl indicates a time point at which the first detection signal has been given. If the flag Ftl has been set to "1", the microcomputer 2 directly enters from the step 192 to the step 195 without entering the steps 193 and 194. On the other hand, in the step 190 of FIG. 16, if the first detection signal is not input from the front acceleration sensor 90, the microcomputer 2 directly enters a step 202 of FIG. 18.

In the step 195, the microcomputer 2 decides whether the second detection signal representative of detection of the second predetermined collision acceleration larger than the first predetermined collision acceleration is input from the front acceleration sensor 90. If the second detection signal is input, the microcomputer 2 enters a step 196 and sets a second decrement flag M to "1". The second decrement flag M is a flag for indicating whether to further decrease the threshold value Vth. The flag M is reset to "0" in the initialization of the step 180 and the step 184 of the reset processing. Thereafter, the microcomputer 2 enters a step 197 and decides whether a second decision flag Ftm is "1". The second decision flag Ftm is a flag for deciding whether the second detection signal from the front acceleration sensor 90 is input for the first time after starting the control processing. The flag Ftm is reset to "0" in the initialization of the step 180 and the step 184 of the reset processing, and is set to "1" in a step 199 described below. Therefore, when the second detection signal is input from the front acceleration sensor 90 for the first time, the status of the flag Ftm in the step 197 is "0". In this case, the microcomputer 2 recognizes the second time point Tm from the soft-timer t in a step 198, sets the flag Ftm to "1" in a following step 199, and enters a step 200. The second time point Tm indicates a time point at which the second detection signal has been given. When the flag Ftq is "1" in the step 197, the microcomputer 2 directly enters from the step 197 to the step 200 without entering the steps 198 and 199. On the other hand, in the step 195, if the second detection signal is not input from the front acceleration sensor 90, the microcomputer 2 directly enters the step 202 of FIG. 18.

In the step 200, the microcomputer 12 decides whether a time difference Tm−Tl between the second time point Tm and the first time point Tl is smaller than a predetermined value To. If the time difference Tm−Tl is smaller than the predetermined value To, the microcomputer 2 recognizes an occurrence of a collision with a large impact, such as a high-speed collision, in which the occupant protection device 7 is required to drive quickly, and enters a step 201.

In the step 201, a third decrement flag N is set to "1". The third decrement flag N is a flag for indicating whether to furthermore decrease the threshold value Vth. The third decrement flag N is reset to "0" in the initialization of the step 180 and the step 184. Thereafter, the microcomputer 2 enters the step 202 of FIG. 18. On the other hand, in the step 200, If the time difference Tm−Tl is not smaller than the predetermined value To, the microcomputer 2 directly enters the step 202 of FIG. 18 without entering the step 201.

In the step 202 of FIG. 18, the microcomputer 2 decides whether the first decrement flag L is "1". When the flag L is not "1", namely if the first detection signal is not input from the front acceleration sensor 90, the microcomputer 2 sets a basic threshold value Vtho as the threshold value Vth in a step 203, and then enters a step 209. When the flag L is "1", namely if the first detection signal is input from the front acceleration sensor 90, the microcomputer 2 enters from the step 202 to a step 204 and decides whether the second decrement flag M is "1". When the second decrement flag M is not "1", namely if the second detection signal is not input from the front acceleration sensor 90, the microcomputer 2 enters a step 205. In the step 205, a value Vtho-Vsub1 is computed by subtracting the first decrement value Vsub1 from the basic threshold value Vtho, and the value Vtho-Vsub1 is set as the threshold value Vth. Thereafter, the microcomputer 2 enters the step 209. When the second decrement flag M is "1", the microcomputer 2 enters from the 204 to a step 206 and decides whether the third decrement flag N is "1". When the third decrement flag N is not "1", namely if the time difference Tm−Tl between the first and second time points Ti and Tm is not smaller than the predetermined value To, the microcomputer 2 enters a step 207. In the step 207, a value Vtho-Vsub2 is computed by subtracting the second decrement value Vsub2 larger than the first decrement value Vsub1 from the basic threshold value Vtho, and the value Vtho-Vsub2 is set as the threshold value Vth. Thereafter, the microcomputer 2 enters the step 209. When the third decrement flag N is "1", namely if the time difference Tm−Tl is smaller than the predetermined value To, the microcomputer 2 enters from the step 206 to a step 208. In the step 208, a value Vtho-Vsub3 is computed by subtracting the third decrement value Vsub3 larger than the second decrement value Vsub2 from the basic threshold value Vtho, and the value Vtho-Vsub3 is set as the threshold value Vth. Thereafter, the microcomputer 2 enters the step 209.

In the step 209, the microcomputer 2 decides whether the integrated value ΔVt of the acceleration signal Gt of the room acceleration sensor 6 is larger than the threshold value Vth. When the integrated value ΔVt is not larger than the threshold value Vth, the microcomputer 2 returns to the step 181 of FIG. 16, and the aforementioned control processing is repeated. When the integrated value ΔVt is larger than the threshold value Vth, the microcomputer 2 enters a step 210, outputs the collision detection signal to the drive circuit 4, and finishes the control processing.

In the seventh embodiment, for example, in a case in which a collision comes to an end under a state that the integrated value ΔVt of the room acceleration sensor 6 does not exceed the threshold value Vth though the first detection signal from the front acceleration sensor 90 has been given, the first decrement flag L and the first decision flag Ftl are reset in the steps 180 and 184. Because of this, the flags L and Ftl do not stay at the state of "1".

According to the seventh embodiment described above, in addition to the decrease of the threshold value Vth based on the first and second detection signals of the front acceleration sensor 90 as described in the sixth embodiment of FIG. 14 and FIG. 15, the integrated value ΔVt is further decreased when the time difference Tm−Tl between the first and second collision times Tl and Tm is smaller than the predetermined value To. Hence, even in case of a collision such as a high-speed collision, it is possible to exactly drive the occupant protection device 7 without causing a delay in the collision decision.

Although one front acceleration sensor is used in the seventh embodiment, this is not intended to limit the scope of the invention. The present invention can be also applied to a case in which a plurality of front acceleration sensors are used, as shown in FIG. 13, for example. In a case in which the first and second front acceleration sensors 90a and 90b are provided as shown in FIG. 13, whether the first detection signal is input from at least one of the first and second front acceleration sensor 90a and 90b is decided in the step 190 of FIG. 16, and whether the second detection signal is input from at least one of the first and second front acceleration sensors 90a and 90b is decided in the step 195 of FIG. 17.

From foregoing it will now be apparent that a new and improved control apparatus of an occupant protection device has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A control apparatus of an occupant protection device having a room acceleration sensor, provided in a room of a vehicle, for detecting an acceleration of the vehicle and outputting an acceleration signal representative thereof, comprising:
    at least one front acceleration sensor, provided in a front part of the vehicle, for detecting the acceleration of the vehicle, and for outputting a detection signal when detecting a predetermined collision acceleration; and
    a control unit, connected to said room acceleration sensor and said front acceleration sensor, for inputting the acceleration signal of said room acceleration sensor and the detection signal of said front acceleration sensor, for setting a first threshold value when the detection signal is not input, for setting a second threshold value lower than the first threshold value when the detection signal is input, and for driving the occupant protection device when an integrated value of the acceleration signal of said room acceleration sensor exceeds the set threshold value.

2. The control apparatus of claim 1, having a plurality of front acceleration sensors, wherein said control unit sets the second threshold value when the detection signal is input from at least one of the front acceleration sensors.

3. The control apparatus of claim 1, wherein said control unit, when the integrated value is not larger than the second threshold value, decides whether to drive the occupant protection device based on a comparison between the integrated value and the first threshold value.

4. A control apparatus of an occupant protection device having a room acceleration sensor, provided in a room of a vehicle, for detecting an acceleration of the vehicle and outputting an acceleration signal representative thereof, comprising:
    at least one front acceleration sensor, provided in a front part of the vehicle, for detecting the acceleration of the vehicle, and for outputting a detection signal when detecting a predetermined collision acceleration; and
    a control unit, connected to said room acceleration sensor and said front acceleration sensor, for inputting the acceleration signal of said room acceleration sensor and the detection signal of said front acceleration sensor, for setting a basic threshold value as a threshold value when the detection signal is not input, for setting a low threshold value as the threshold value by subtracting a predetermined decrement value from the basic threshold value when the detection signal is input, and for driving the occupant protection device when an integrated value of the acceleration signal of said room acceleration sensor exceeds the threshold value.

5. The control apparatus of claim 4, having a plurality of front acceleration sensors, wherein said control unit sets the low threshold value when the detection signal is input from at least one of the front acceleration sensors.

6. The control apparatus of claim 1 or 4, wherein said front acceleration sensor comprises:
    a piezo-electric element for detecting the acceleration;
    an amplifier circuit for inputting voltage outputs of both ends of said piezo-electric element, for differentially amplifying and integrating the voltage outputs of said piezo-electric element, and for outputting an integrated value of a detected acceleration;
    a bias resistor circuit provided at an input side of said amplifier circuit;
    a condenser inserted in parallel with said piezo-electric element so as to lower a lower cut-off frequency without increasing resistance values of said bias resistor circuit;
    temperature compensation means for adjusting a gain of said amplifier circuit so that an output-temperature characteristic of said piezo-electric element is compensated;
    a reference voltage circuit for giving a reference potential to said amplifier circuit and said bias resistor circuit; and
    a comparison circuit for inputting the output of said amplifier circuit, and for outputting the detection signal based on a comparison between the output of said amplifier circuit and a reference voltage.

7. The control apparatus of claim 6, wherein a capacity o f said condenser is set so that resistors of said bias resistor circuit have values that can be used in a normal atmosphere and so that the lower cut-off frequency have a low value in which velocity variations can easily be detected.

8. The control apparatus of claim 6, wherein:
    said amplifier circuit includes a first non-inverting amplifier circuit for non-inversion amplifying one voltage output of said piezo-electric element, a second non-inverting amplifier circuit for non-inversion amplifying the other voltage output of said piezo-electric element, and a differential amplifier circuit for differentially amplifying outputs of said first and second non-inverting amplifier circuits, said first and second non-inverting amplifier circuits and/or said differential amplifier circuit having an integrating function; and
    said temperature compensation means is a single temperature compensation element for adjusting gains of said first and second non-inverting amplifier circuits.

9. The control apparatus of claim 8, wherein:
    said first non-inverting amplifier circuit has a first operational amplifier, one input terminal of the first operational amplifier being connected to one end of said piezo-electric element, and the other input terminal of the first operational amplifier being connected to an output terminal of the first operational amplifier by way of a parallel connection of a first resistor and a first condenser;

said second non-inverting amplifier circuit has a second operational amplifier, one input terminal of the second operational amplifier being connected to the other end of said piezo-electric element, and the other input terminal of the second operational amplifier being connected to an output terminal of the second operational amplifier by way of a parallel connection of a second resistor and a second condenser; and said temperature compensation element is inserted between the other input terminal of the first operational amplifier and the other input terminal of the second operational amplifier, and decreases the gains of the first and second operational amplifiers when temperature rises and increases these gains when temperature drops.

10. The control apparatus of claim 8, wherein said differential amplifier circuit has a third operational amplifier, one input terminal of the third operational amplifier being connected to an output terminal of said second non-inverting amplifier circuit by way of a third resistor and being also connected to said reference voltage circuit by way of a parallel connection of a fourth resistor and a third condenser, and the other input terminal of the third operational amplifier being connected to an output terminal of said first non-inverting amplifier circuit by way of a fifth resistor and being also connected to an output terminal of the third operational amplifier by way of a parallel connection of a sixth resistor and a fourth condenser.

11. The control apparatus of claim 8, wherein the gains of said first and second non-inverting amplifier circuits are set so that decrement in the voltage outputs of said piezo-electric element due to the parallel insertion of said condenser to said piezo-electric element can be supplemented.

12. The control apparatus of claim 8, wherein:

said differential amplifier circuit has an operational amplifier, one input terminal of the operational amplifier receiving the output of said second non-inverting amplifier circuit and the reference potential of said reference voltage circuit, and the other input terminal of the operational amplifier receiving the output of said first non-inverting amplifier circuit; and said reference voltage circuit has a reference voltage buffer amplifier for matching with output impedances of said first and second non-inverting amplifier circuits, and supplies the reference potential to at least said differential amplifier circuit by way of the reference voltage buffer amplifier.

13. The control apparatus of claim 6, wherein said comparison circuit includes:

a comparator for inputting the output of said amplifier circuit and the reference voltage, and for outputting the detection signal when the output of said amplifier circuit exceeds the reference voltage; and a chattering prevention circuit for preventing chattering of said comparator by providing the detection signal as feedback to an input side of said comparator receiving the output of said amplifier circuit when the output of said amplifier circuit exceeds the reference voltage.

14. The control apparatus of claim 6, wherein:

said front acceleration sensor has a sensor power supply line to which a constant voltage is supplied from an outside;

said comparison circuit includes a comparator which inputs the output of said amplifier circuit and the reference voltage and outputs the detection signal when the output of the amplifier circuit exceeds the reference value, and a switching element which is inserted between the sensor power supply line and the ground and is made On by the detection signal of the comparator; and the detection signal of said front acceleration sensor is output as current variation in the sensor power supply line.

15. The control apparatus of claim 14, wherein said control unit includes a unit power supply line for supplying the constant voltage to the sensor power supply line by way of a transmission cable, and a receiving circuit for receiving the detection signal from said front acceleration by detecting the current variation in the unit power supply line.

16. The control apparatus of claim 15, wherein said receiving circuit comprises:

a current mirror circuit, inserted between the unit power supply line and the transmission cable, for giving a current output according to the current variation representative of the detection signal of said front acceleration sensor; and a detection resistor, inserted between an output side of the current mirror circuit and the ground, for outputting a voltage signal corresponding to the current output of the current mirror circuit.

17. A control apparatus of an occupant protection device having a room acceleration sensor, provided in a room of a vehicle, for detecting an acceleration of the vehicle and outputting an acceleration signal representative thereof, comprising:

at least one front acceleration sensor, provided in a front part of the vehicle, for detecting the acceleration of the vehicle, for outputting a first detection signal when detecting a first predetermined collision acceleration, and for outputting a second detection signal when detecting a second predetermined collision acceleration larger than the first predetermined collision acceleration; and a control unit, connected to said room acceleration sensor and said front acceleration sensor, for inputting the acceleration signal of said room acceleration sensor and the first and second detection signals of said front acceleration sensor, for increasing an integrated value of the acceleration signal of said room acceleration sensor by adding a first addition value to said integrated value when the first detection signal is input, for further increasing said integrated value by adding a second addition value larger than the first addition value to said integrated value when the second detection signal is input, and for driving the occupant protection device when said integrated value exceeds a predetermined threshold value.

18. The control apparatus of claim 17, having a plurality of front acceleration sensors, wherein said control unit increases said integrated value when the first detection signal is input from at least one of the front acceleration sensors, and further increases said integrated value when the second detection signal is input from at least one of the front acceleration sensors.

19. The control apparatus of claim 17, wherein:

said control unit recognizes a first time point at which the first detection signal is input and a second time point at which the second detection signal is input; and said control unit decides whether a time difference between the first and second time points is smaller than a predetermined value, and further increases said integrated value by adding a third addition value larger than the second addition value to said integrated value when the time difference is smaller than the predetermined value.

20. A control apparatus of an occupant protection device having a room acceleration sensor, provided in a room of a vehicle, for detecting an acceleration of the vehicle and outputting an acceleration signal representative thereof, comprising:

at least one front acceleration sensor, provided in a front part of the vehicle, for detecting the acceleration of the vehicle, for outputting a first detection signal when detecting a first predetermined collision acceleration, and for outputting a second detection signal when detecting a second predetermined collision acceleration larger than the first predetermined collision acceleration; and a control unit, connected to said room acceleration sensor and said front acceleration sensor, for inputting the acceleration signal of said room acceleration sensor and the first and second detection signals of said front acceleration sensor, for setting a basic threshold value as a threshold value when the first and second detection signals are not input, for setting a first low threshold value lower than the basic threshold value as the threshold value when the first detection signal is input, for setting a second low threshold value lower than the first low threshold value as the threshold value when the second detection signal is input, and for driving the occupant protection device when an integrated value of the acceleration signal of said room acceleration sensor is larger than the threshold value.

21. The control apparatus of claim 20, having a plurality of front acceleration sensors, wherein said control unit sets the first low threshold value when the first detection signal is input from at least one of the front acceleration sensors, and sets the second low threshold value when the second detection signal is input from at least one of the front acceleration sensors.

22. The control apparatus of claim 20, wherein:

said control unit recognizes a first time point at which the first detection signal is input and a second time point at a which the second detection signal is input; and said control unit decides whether a time difference between the first and second time points is smaller than a predetermined value, and sets a third low threshold value lower than the second low threshold value as the threshold value when the time difference is smaller than the predetermined value.

23. The control apparatus of claim 1, 4, 17 or 20, wherein:

said control unit has a reference value for deciding whether to integrate the acceleration signal of said room acceleration sensor;

said control unit integrates the acceleration signal of said room acceleration sensor when the acceleration signal is larger than the reference value; and said control unit, when the acceleration signal is smaller than the reference value, processes the integrated value of the acceleration signal of said room acceleration sensor gradually toward a reset direction.

24. The control apparatus of claim 1, 4, 17 or 20 wherein said front acceleration sensor is provided near a radiator of a center part of a vehicle front.

25. The control apparatus of claim 2, 5, 18 or 21, having first and second front acceleration sensors, wherein said first and second front acceleration sensors are provided near right and left portions of a radiator of a vehicle front, respectively.

26. The control apparatus of claim 17 or 20, wherein said front acceleration sensor comprises:

a piezo-electric element for detecting the acceleration;

an amplifier circuit for inputting voltage outputs of both ends of said piezo-electric element, for differentially amplifying and integrating the voltage outputs of said piezo-electric element, and for outputting an integrated value of a detected acceleration;

a bias resistor circuit provided at an input side of said amplifier circuit;

a condenser inserted in parallel with said piezo-electric element so as to lower a lower cut-off frequency without increasing resistance values of said bias resistor circuit;

temperature compensation means for adjusting a gain of said amplifier circuit so that an output-temperature characteristic of said piezo-electric element is compensated;

a reference voltage circuit for giving a reference potential to said amplifier circuit and said bias resistor circuit;

a first comparison circuit for inputting the output of said amplifier circuit, and for outputting the first detection signal based on a comparison between the output of said amplifier circuit and a first reference voltage; and a second comparison circuit for inputting the output of said amplifier circuit, and for outputting the second detection signal based on a comparison between the output of said amplifier circuit and a second reference voltage higher than the first reference voltage.

27. The control apparatus of claim 26, wherein a capacity of said condenser is set so that resistors of said bias resistor circuit have values that can be used in a normal atmosphere and so that the lower cut-off frequency have a low value in which velocity variations can easily be detected.

28. The control apparatus of claim 26, wherein:

said amplifier circuit includes a first non-inverting amplifier circuit for non-inversion amplifying one voltage output of said piezo-electric element, a second non-inverting amplifier circuit for non-inversion amplifying the other voltage output of said piezo-electric element, and a differential amplifier circuit for differentially amplifying outputs of said first and second non-inverting amplifier circuits, said first and second non-inverting amplifier circuits and/or said differential amplifier circuit having an integrating function; and said temperature compensation means is a single temperature compensation element for adjusting gains of said first and second non-inverting amplifier circuits.

29. The control apparatus of claim 28, wherein:

said first non-inverting amplifier circuit has a first operational amplifier, one input terminal of the first operational amplitfier being connected to one end of said piezo-electric element, and the other input terminal of the first operational amplifier being connected to an output terminal of the first operational amplifier by way of a parallel connection of a first resistor and a first condenser;

said second non-inverting amplifier circuit has a second operational amplifier, one input terminal of the second operational amplifier being connected to the other end of said piezo-electric element, and the other input terminal of the second operational amplifier being connected to an output terminal of the second operational amplifier by way of a parallel connection of a second resistor and a second condenser; and said temperature compensation element is inserted between the other input terminal of the first operational amplifier and the other input terminal of the second operational amplifier, and decreases the gains of the first and second operational amplifiers when temperature rises and increases these gains when temperature drops.

30. The control apparatus of claim 28, wherein said differential amplifier circuit has a third operational amplifier, one input terminal of the third operational amplifier being connected to an output terminal of said second non-inverting amplifier circuit by way of a third resistor and being also connected to said reference voltage circuit by way of a parallel connection of a fourth resistor and a third condenser, and the other input terminal of the third operational amplifier being connected to an output terminal of said first non-inverting amplifier circuit by way of a fifth resistor and being also connected to an output terminal of the third operational amplifier by way of a parallel connection of a sixth resistor and a fourth condenser.

31. The control apparatus of claim 28, wherein the gains of said first and second non-inverting amplifier circuits are set so that decrement in the voltage outputs of said piezo-electric element due to the parallel insertion of said condenser to said piezo-electric element can be supplemented.

32. The control apparatus of claim 28, wherein:

said differential amplifier circuit has an operational amplifier, one input terminal of the operational amplifier receiving the output of said second non-inverting amplifier circuit and the reference potential of said reference voltage circuit, and the other input terminal of the operational amplifier receiving the output of said first non-inverting amplifier circuit; and said reference voltage circuit has a reference voltage buffer amplifier for matching with output impedances of said first and second non-inverting amplifier circuits, and supplies the reference potential to at least said differential amplifier circuit by way of the reference voltage buffer amplifier.

33. The control apparatus of claim 26, wherein said first comparison circuit includes:

a first comparator for inputting the output of said amplifier circuit and the first reference voltage, and for outputting the first detection signal when the output of said amplifier circuit exceeds the first reference voltage; and a first chattering prevention circuit for preventing chattering of said first comparator by providing the first detection signal as feedback to an input side of said first comparator receiving the output of said amplifier circuit when the output of said amplifier circuit exceeds the first reference voltage;

and wherein said second comparison circuit includes:

a second comparator for inputting the output of said amplifier circuit and the second reference voltage, and for outputting the second detection signal when the output of said amplifier circuit exceeds the second reference voltage; and a second chattering prevention circuit for preventing chattering of said second comparator by providing the second detection signal as feedback to an input side of said second comparator receiving the output of said amplifier circuit when the output of said amplifier circuit exceeds the second reference voltage.

34. The control apparatus of claim 26, wherein:

said front acceleration sensor has a sensor power supply line to which a constant voltage is supplied from an outside;

said first comparison circuit includes a first comparator which inputs the output of said amplifier circuit and the first reference voltage and outputs the first detection signal when the output of the amplifier circuit exceeds the first reference value, and a first switching element which is inserted between the sensor power supply line and the ground and is made On by the first detection signal of the first comparator;

said second comparison circuit includes a second comparator which inputs the output of said amplifier circuit and the second reference voltage and outputs the second detection signal when the output of the amplifier circuit exceeds the second reference value, and a second switching element which is inserted between the sensor power supply line and the ground and is made On by the second detection signal of the second comparator; and the first and second detection signals of said front acceleration sensor is output as current variations in the sensor power supply line.

35. The control apparatus of claim 34, wherein said control unit includes a unit power supply line for supplying the constant voltage to the sensor power supply line by way of a transmission cable, and a receiving circuit for receiving the first and second detection signals from said front acceleration sensor by detecting the current variations in the unit power supply line.

36. The control apparatus of claim 35, wherein said receiving circuit comprises:

a current mirror circuit, inserted between the unit power supply line and the transmission cable, for giving a current output according to the current variations representative of the first and second detection signals of said front acceleration sensor; and a detection resistor, inserted between an output side of the current mirror circuit and the ground, for outputting a voltage signal corresponding to the current output of the current mirror circuit.

* * * * *